United States Patent
Ricci et al.

(10) Patent No.: US 9,200,101 B2
(45) Date of Patent: Dec. 1, 2015

(54) OXO-NITROGENATED COMPLEX OF LANTHANIDES, CATALYTIC SYSTEM COMPRISING SAID OXO-NITROGENATED COMPLEX AND PROCESS FOR THE (CO)POLYMERIZATION OF CONJUGATED DIENES

(75) Inventors: Giovanni Ricci, Parma (IT); Anna Sommazzi, Novara (IT); Giuseppe Leone, Milan (IT); Aldo Boglia, Milan (IT); Francesco Masi, Sant'Angelo Lodigiano (LO) (IT)

(73) Assignee: Versalis S.P.A., San Donato Milanese (IT)

( * ) Notice: Subject to any disclaimer, the term of this patent is extended or adjusted under 35 U.S.C. 154(b) by 0 days.

(21) Appl. No.: 14/344,016

(22) PCT Filed: Sep. 13, 2012

(86) PCT No.: PCT/EP2012/067990
§ 371 (c)(1),
(2), (4) Date: Mar. 10, 2014

(87) PCT Pub. No.: WO2013/037911
PCT Pub. Date: Mar. 21, 2013

(65) Prior Publication Data
US 2014/0221592 A1 Aug. 7, 2014

(30) Foreign Application Priority Data
Sep. 14, 2011 (IT) .............................. MI2011A1652

(51) Int. Cl.
*C08F 136/06* (2006.01)
*C08F 36/00* (2006.01)
*C08F 136/00* (2006.01)
*C08F 136/08* (2006.01)
*B01J 31/00* (2006.01)

(52) U.S. Cl.
CPC ............... *C08F 136/06* (2013.01); *C08F 36/00* (2013.01); *C08F 136/00* (2013.01); *C08F 136/08* (2013.01); *B01J 31/00* (2013.01)

(58) Field of Classification Search
CPC .................................... C08F 4/52; C08F 4/545
USPC ................ 526/172, 340.2, 335, 164; 528/396
See application file for complete search history.

(56) References Cited

U.S. PATENT DOCUMENTS

| | | | | |
|---|---|---|---|---|
| 5,782,986 A | * | 7/1998 | Butterbaugh et al. | ......... 134/1.3 |
| 6,544,919 B1 | | 4/2003 | Tagge | |
| 6,780,947 B1 | * | 8/2004 | Sommazzi et al. | ........... 526/161 |
| 6,943,224 B2 | * | 9/2005 | Shih | ............................. 526/113 |
| 2006/0074207 A1 | * | 4/2006 | Halasa et al. | ................. 526/134 |
| 2008/0114136 A1 | | 5/2008 | Suzuki et al. | |
| 2010/0286350 A1 | | 11/2010 | Cui et al. | |

FOREIGN PATENT DOCUMENTS

EP    1367069 A1   12/2003

OTHER PUBLICATIONS

Zhang et al., J. Mol. Catal. A: Chemical 2007, 265, 159-166.*
Small et al., Macromolecules 2004, 37, 4375-4386.*
Zafiropoulos, T.F.; Perlepes, S.P. Monatshefte fur Chemie, 1990, 121, 715-725.*
Yoshida, N.; Matsumoto, A.; Shiokawa et al. Nippon Kagaku Kaishi, 1974, 11, 2219-2220.*
Chyragov, F.M. Koordinatsionnaya Khimiya, 1992, 18, 1228-1231.*

* cited by examiner

*Primary Examiner* — Rip A Lee
(74) *Attorney, Agent, or Firm* — Tarolli, Sundheim, Covell & Tummino LLP

(57) ABSTRACT

An oxo-nitrogenated complex of lanthanides having general formula (I) or (II). Said oxo-nitrogenated complex of lanthanides having general formula (I) or (II) can be advantageously used in a catalytic system for the (co)polymerization of conjugated dienes.

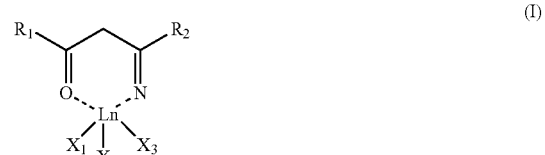

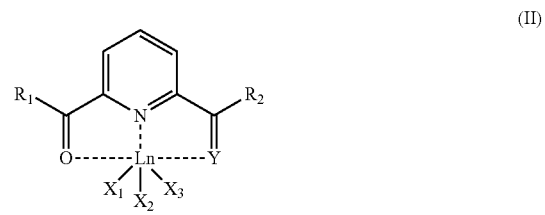

8 Claims, 17 Drawing Sheets $^1$H-NMR spectra of polybutadiene (on the left; Table 1, Example 37) and polyisoprene (on the right; Table 2, Example 46) obtained by means of the classical ternary system $AlEt_2Cl/Nd(OCOC_7H_{15})_3/Al(^iBu)_3$ FT-IR spectra of polybutadienes obtained with (a) AlEt$_2$Cl/Nd(OCOC$_7$H$_{15}$)$_3$/Al($^i$Bu)$_3$ (Table 1, Example 37); (b) NdCl$_3$(L1)/TIBAO (Table 1, Example 21); (c) NdCl$_3$(L6)/DIBAH (Table 1, Example 29); (d) NdCl$_3$(L6)/TIBAO (Table 1, Example 28); (e) NdCl$_3$(L7)/TIBAO (Table 1, Example 31); (f) NdCl$_3$(L7)/DIBAH (Table 1, Example 32)

$^1$H-NMR spectra (on the left) and $^{13}$C-NMR (on the right) ($C_2D_2Cl_4$ as deuterated solvent, HMDS as internal standard, 103°C) of polybutadiene obtained with $NdCl_3(L6)$/TIBAO (Table 1, Example 28) (content of 1,4-cis units equal to 99.6%).

$^1$H-NMR spectra (on the left) and $^{13}$C-NMR (on the right) ($C_2D_2Cl_4$ as deuterated solvent, HMDS as internal standard, 103°C) of polybutadiene obtained with $NdCl_3$(L6)/DIBAH (Table 1, Example 29) (content of 1,4-cis units equal to 99.4%).

$^1$H-NMR spectra (on the left) and $^{13}$C-NMR (on the right) ($C_2D_2Cl_4$ as deuterated solvent, HMDS as internal standard, 103°C) of polybutadiene obtained with $NdCl_3(L8)/DIBAH$ (Table 1, Example 34)(content of 1,4-cis units equal to 99.5%).

$^1$H-NMR spectra (below) and $^{13}$C-NMR spectrum (above) ($C_2D_2Cl_4$ as deuterated solvent, HMDS as internal standard, 103°C) of polyisoprene obtained with $NdCl_3(L7)$/TIBAO (Table 2, Example 42)(content of 1,4-cis units equal to 98%).

DSC diagram of polyisoprene obtained with $NdCl_3$(L6)/TIBAO (Table 2, Example 40)

DSC diagram of polyisoprene obtained with NdCl$_3$(L7)/TIBAO (Table 2, Example 43)

DSC Diagram del polyisoprene obtained with NdCl$_3$(L7)/DIBAH (Table 2, Example 44)

DSC diagram del polyisoprene obtained with NdCl$_3$(L7)/MMAO (Table 2, Example 45)

DSC diagram of natural rubber (Table 2, Example NR)

FT-IR (nujol) spectrum of the ligant (L1) (Example 1)

FT-IR (nujol) spectrum of the complex NdCl$_3$(L1) (Example 13)

FT-IR (nujol) spectrum of the ligand (L7) (Example 7)

FT-IR (nujol) spectrum of the complex $NdCl_3(L7)$ (Example 17)

FT-IR (nujol) spectrum of the ligand (L13)

FT-IR (nujol) spectrum of the complex $NdCl_3(L13)$ (Example 20)

US 9,200,101 B2

OXO-NITROGENATED COMPLEX OF LANTHANIDES, CATALYTIC SYSTEM COMPRISING SAID OXO-NITROGENATED COMPLEX AND PROCESS FOR THE (CO)POLYMERIZATION OF CONJUGATED DIENES

The present invention relates to an oxo-nitrogenated complex of lanthanides.

More specifically, the present invention relates to an oxo-nitrogenated complex of lanthanides and its use in a catalytic system for the (co)polymerization of conjugated dienes.

The present invention also relates to a catalytic system for the (co)polymerization of conjugated dienes comprising said oxo-nitrogenated complex of lanthanides.

Furthermore, the present invention relates to a (co)polymerization process of conjugated dienes, in particular a process for the polymerization of 1,3-butadiene or isoprene, characterized in that it uses said catalytic system.

BRIEF DESCRPTION OF THE DRAWINGS

FIG. 1 illustrates $^1$H-NMR spectra of polybutadiene (on the left; Table 1, Example 37) and polyisoprene (on the right; Table 2, Example 46) obtained by means of the classical ternary system AlEt$_2$Cl/Nd (OCOC$_7$H$_{15}$)$_3$/Al ($^i$Bu)$_3$.

Figure 1:
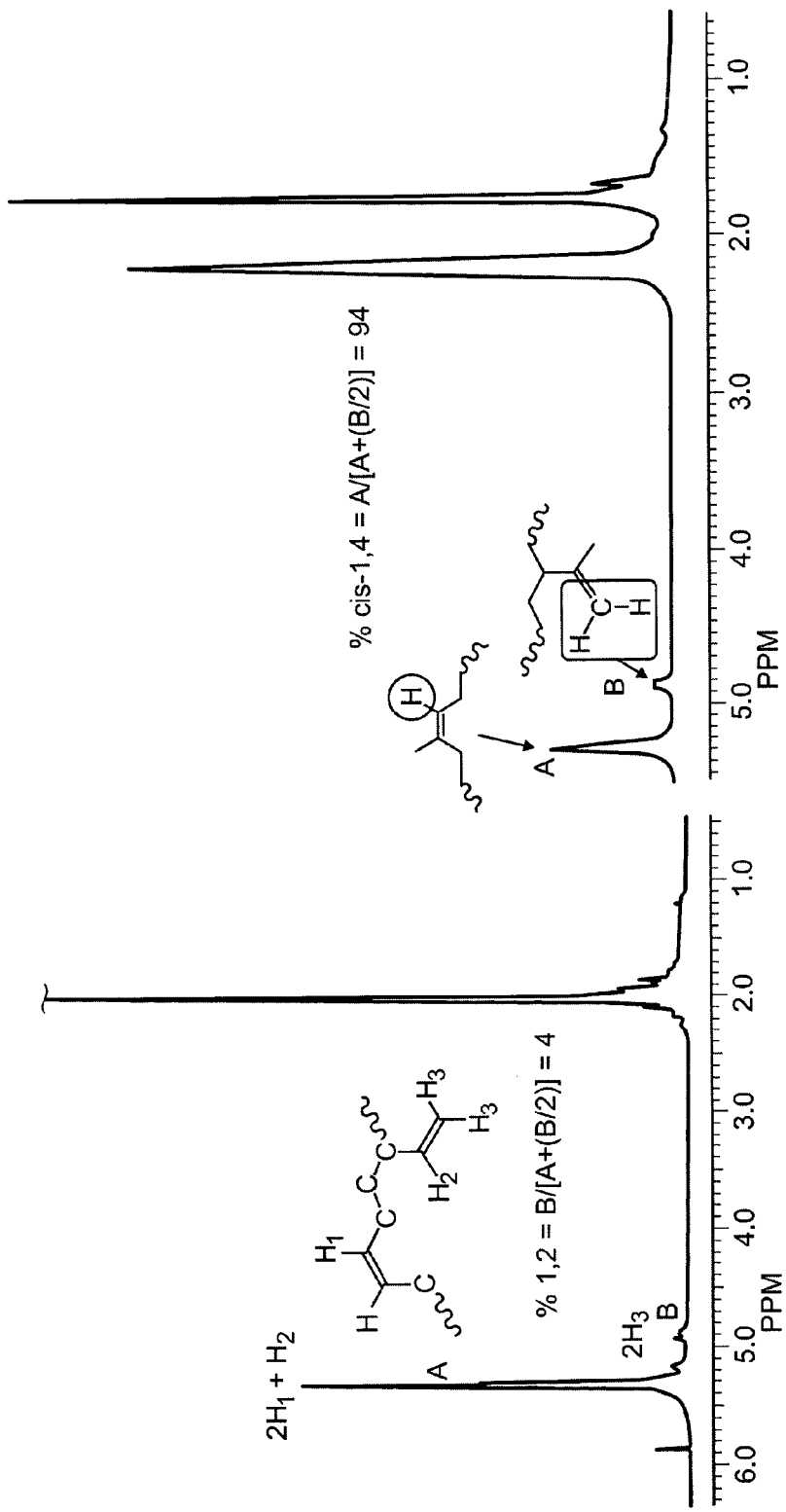

It is known that the stereospecific (co)polymerization of conjugated dienes is an extremely important process in the chemical industry for obtaining products which are among the most widely-used rubbers.

It is known, for example, that polybutadiene 1,4-cis is a synthetic elastomer whose properties are very similar to those of natural rubber. Since the beginning of stereospecific polymerization, numerous catalytic systems have been used for the production of this elastomer, as described, for example, by Porri L. et al. in: "Comprehensive Polymer Science" (1989), Eastmond G. C. et al. Eds., Pergamon Press, Oxford, UK, Vol. 4, Part II, pages 53-108.

A first catalytic system capable of giving a polybutadiene having a content of 1,4-trans units ranging from 70% to 90% is described in U.S. Pat. No. 3,050,513 and was based on titanium compounds containing iodine, such as, for example, titanium tetraiodide (TiI$_4$), combined with an aluminium hydride such as, for example, lithium-aluminium hydride, sodium-aluminium hydride, potassium-aluminium hydride, rubidium-aluminium hydride, caesium-aluminium hydride.

Efforts were then made in the art to find catalytic systems capable of giving polybutadiene having a high content of 1,4-cis units.

Catalytic systems capable of giving a polybutadiene having a 1,4-cis content equal to about 93% are described, for example, by W. Cooper in "The Stereo Rubbers" (1977), Ed. W. M. Saltman, Wiley, New York, page (catalytic system: AliBu$_3$-TiI$_4$); W. Marconi et al., in "Chimica Industriale" (1963), Vol. 45, page 522 (catalytic system: AlEt$_3$-AlEt$_2$I—TiCl$_4$); W. Marconi et al., in "Journal of Polymer Science" (1965), Part A, Vol. 3, page 735 (catalytic system: AlHCl$_2$.OEt$_2$-TiCl$_4$—AlI$_3$).

The formation of catalytic systems characterized by a higher stereospecificity capable of giving polybutadiene having a content of 1,4-cis units equal to about 96%, is described, for example: with respect to catalytic systems comprising cobalt, in Italian patent IT 592,477 and by Gippin M. et al. in "Industrial & Engineering Chemistry, Product Research and Development" (1962), Vol. 1(1), pages 32-39; with respect to catalytic systems comprising nickel, by Ueda et. al., in "Koogyo Kagaku Zasshi" (1963), Vol. 66, page 1103, and by i et al. in "Rubber Chemistry and Technology" (1972), Vol. 45, pages 268-277.

Some works relating to the use of catalytic systems comprising lanthanides for the 1,4-cis polymerization of conjugated dienes were published in the first half of the sixties'.

Saltman et al. in "Rubber Chemistry and Technology" (1973), Vol. 46, page 1055 and Throckmorton et al. in "Kautschuk and Gummi Kunstoffe" (1969), Vol. 22, page 293, for example, describe the use of catalytic systems comprising cerium. These catalytic systems, however, were soon abandoned as a result of the metal residues remaining in the polymer which caused an oxidation of the polymer itself.

The use of catalytic systems comprising lanthanides such as, for example, neodymium, praseodymium and gadolinium, is also known, as described, for example, by: Hsieh H. L. et al. in "Rubber Chemistry and Technology" (1985), Vol. 58(1), pages 117-145. The polybutadiene obtained using these catalytic systems has a content of 1,4-cis units of about 98%, a good processability, and a relatively broad molecular weight distribution.

The use is also known of catalytic systems comprising uranium allyls capable of providing a polybutadiene having a very high content of 1,4-cis units (i.e. 99%) as described, for example, by Lugli et al. in "Die Makromoleculare Chemie" (1974), Vol. 175, Issue 7, pages 2021-2027; De Chirico A. et al. in "Die Makromoleculare Chemie" (1974), Vol. 175, Issue 7, pages 2029-2038; Bruzzone M. et al. in "Rubber Chemistry and Technology" (1974), Vol. 47, page 1175; Mazzei A. in "Die Makromoleculare Chemie" (1981), Vol. 4, Issue Supplement 3, pages 61-72. These catalytic systems, however, were also abandoned due to the presence of radioactive residues in the polymers obtained.

From the above documents it emerges, however, that the use of catalytic systems comprising lanthanides offered advantages with respect to the use of catalysts based on titanium, cobalt and nickel, previously proposed and in use at that time. In particular, catalytic systems comprising lanthanides, as mentioned above, were capable of giving polymers, in particular polybutadiene, having a higher content of 1,4-cis units 97%), with a more linear structure and, consequently, more suitable for the production of tyres, which represents the most important application (about 80%) of polybutadiene 1,4-cis use. Furthermore, the above catalytic systems comprising lanthanides did not have a cationic activity and proved to have a higher activity when used in solution polymerization in the presence of aliphatic solvents rather than aromatic solvents, as described, for example, by Ricci G. et al., in "Die Makromoleculare Chemie", Rapid Communications, (1986), Vol. 7, page 335.

Further studies were then carried out with the aim of finding new catalytic systems comprising lanthanides and/or of improving the catalytic activity of already known catalytic systems.

In particular, studies were mainly carried out on catalytic systems comprising neodymium as these catalytic systems had a higher catalytic activity with respect to catalytic systems comprising other lanthanides and they were capable of providing polymers which, after vulcanization, had a higher resistance to aging with respect to the polymers obtained with catalytic systems comprising titanium, cobalt and nickel. Furthermore, these studies were also supported by the great availability, at a low price, of the precursors, including neodymium.

European patent EP 0 076 535, for example, describes an enhanced process for the (co)polymerization of conjugated diolefins comprising the use of a particular catalytic system including at least one compound of a metal selected from those of Group III B of the Periodic System having an atomic number between 21 and 103, preferably neodymium, a derivative of an organic halide and an organometallic compound containing aluminium such as, for example, alkyl aluminium hydride, or trialkyl aluminium hydride. Said process allows (co)polymers having a high content of 1,4-cis units (>98%) and a high linearity, to be obtained.

U.S. Pat. No. 4,242,232 describes a catalyst comprising (a) a reaction mixture formed by reacting a carboxylate of a metal having an atomic number ranging from 57 to 71 such as, for example, lanthanum, cerium, praseodymium, neodymium with an aluminium tri-alkyl, (b) an aluminium alkyl and/or an aluminium alkyl hydride and (c) a Lewis acid. The polybutadiene obtained by using said catalyst has a content of 1,4-cis units ranging from 80% to 99%.

In their simplest form, the catalytic systems comprising neodymium are obtained by reaction between neodymium trichloride, as such or complexed with donors (e.g. alcohols, ethers, tri-butyl-phosphate, alkyl-sulfoxides, amides, pyridine), and an aluminium tri-alkyl (e.g. aluminium tri-isobutyl, aluminium tri-ethyl, aluminium tri-methyl): in this case, these are binary catalytic systems. Said binary catalytic systems are described, for example, by Yang J. H. et al., in "Macromolecules" (1982), Vol. 15(2), pages 230-233; Porri L. et al. in "Macromolecular Symposia" (1998), Vol. 128, Issue 1, pages 53-61.

Alternatively, neodymium chloride can be obtained by reaction of a neodymium compound (e.g., alcoholate, carboxylate) with a chlorine donor (e.g., di-ethyl aluminium chloride, ethyl-aluminium dichloride, bis-aluminium tri-ethyl trichloride, t-butyl chloride) and then reacted with an aluminium alkyl or an aluminium tri-alkyl: in this case, these are tertiary catalytic systems. Said tertiary catalytic systems are described, for example, by: Cabassi F. et al. in "Transition Metal Catalyzed Polymerizations" (1988), Quirk R. P. Ed., Cambridge University Press, MA, USA, pages 655-670; Ricci G. et al. in "Polymer Communications Guilford" (1987), Vol. 28, Issue 8, pages 223-226; or in Italian patent IT 1,197,465.

The order for adding the components (chlorine donor, aluminium alkyl or aluminium tri-alkyl) to the neodymium compound can be extremely important for the nature of the catalytic system to be obtained. By first adding aluminium alkyl hydride or aluminium tri-alkyl and only subsequently the chlorine donor, in fact, homogeneous catalysts are obtained; vice versa, when the chlorine donor is added before the aluminium alkyl hydride or aluminium tri-alkyl, heterogeneous systems are obtained, as described, for example, by Porri et al. in "ACS Symposium Series" (2000), Vol. 749, Chapter 2, pages 15-30. The order of adding the above-mentioned components is also decisive for the catalytic activity and for the polydispersity of the resulting polymers.

In the binary and ternary catalytic systems mentioned above, however, the percentage of neodymium catalytically active is relatively low, normally ranging from 7% to 8% (said percentage referring to the molar percentage of active neodymium with respect to the total moles of neodymium charged), as described, for example, by Marina N. G. et al., in "Doklady Akademii Nauk SSSR" (1982), Vol. 265, pages 1431-1433.

Much more active ternary catalytic systems, containing a higher percentage of catalytically active neodymium, have been obtained by reaction between allyl compounds of neodymium, obtained by reaction between the complex of neodymium chloride with tetrahydrofuran (THF) and allyl Grignard, and aluminium alkyl [e.g., aluminium trialkyl, methylaluminoxane (MAO), tetra-iso-butyl-aluminoxane (TIBAO)], as described, for example, in Italian patent IT 1,228,442; or by: Porri L. et al. in "Macromolecular Symposia" (1993), Vol. 66, pages 231-244; Porri L. et al. in "Polymer Preprints", "American Chemical Society Division Polymer Chemistry" (1998), Vol. 39, pages 214-215; Porri L. in "Recent developments in Lanthanide catalysts for 1,3-diene polymerization", in "ACS Symposium Series 749—Olefin Polymerization: Emerging Frontiers" (2000), P. Arjunan, J. C. McGrath and T. Hanlon Eds., Oxford University Press, USA, pages 15-30. Said ternary catalytic systems provide a polybutadiene having a much lower polydispersity than those obtained by means of the classical ternary catalytic systems mentioned above. Furthermore, said ternary catalytic systems can also produce polyisoprene and/or other polymers deriving from the (co)polymerization of substituted butadienes, providing (co)polymers with a high content of 1,4-cis units (i.e. content≥90%). In particular, a polymer is obtained from the polymerization of isoprene, having a content of 1,4-cis units equal to about 94%, which can be advantageously used for producing elastomeric blends for the production of tyres.

As mentioned above, due to the fact that the (co)polymers of conjugated dienes, in particular polybutadiene and polyisoprene, with a high content of 1,4-cis units, are the polymers most widely used on an industrial scale, in particular for the production of tyres, the study of new catalytic systems capable of providing said (co)polymers, is still of great interest.

The Applicant has faced the problem of finding a new oxo-nitrogenated complex of lanthanides that can be used in a catalytic system capable of providing (co)polymers of conjugated dienes, in particular polybutadiene and polyisoprene, linear or branched, with a high content of 1,4-cis units, i.e. a content of 1,4-cis units ≥99% in the case of polybutadiene, and ≥98% in the case of polyisoprene. Furthermore, said polyisoprene has a glass transition temperature ($T_g$) similar to that of natural rubber.

An object of the present invention therefore relates to an oxo-nitrogenated complex of lanthanides having general formula (I) or (II):

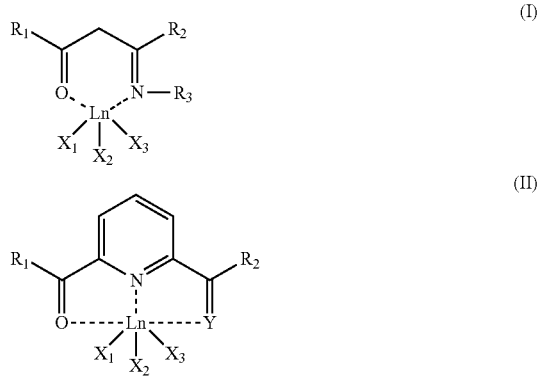

wherein:
Ln represents a metal of the series of lanthanides, preferably selected from neodymium (Nd), lanthanum (La), praseodymium (Pr), gadolinium (Gd), europium (Eu), terbium (Tb), samarium (Sm), erbium (Er), ytterbium (Yb);

$R_1$ and $R_2$, equal to or different from each other, represent a hydrogen atom; or they are selected from linear or branched $C_1$-$C_{20}$, preferably $C_1$-$C_{15}$, alkyl groups, cycloalkyl groups optionally substituted, aryl groups optionally substituted;

$R_3$ represents a hydrogen atom; or it is selected from linear or branched $C_1$-$C_{20}$, preferably $C_1$-$C_{15}$, alkyl groups, cycloalkyl groups optionally substituted, aryl groups optionally substituted; or $R_3$ represents a ketoimine group having the formula:

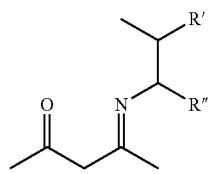

wherein R' and R", equal to or different from each other, represent a hydrogen atom, or they are selected from linear or branched $C_1$-$C_{20}$, preferably $C_1$-$C_{15}$, alkyl groups, cycloalkyl groups optionally substituted, aryl groups optionally substituted;

Y represents an oxygen atom; or a —N—$R_4$ group wherein $R_4$ represents a hydrogen atom, or it is selected from linear or branched $C_1$-$C_{20}$, preferably $C_1$-$C_{15}$, alkyl groups, cycloalkyl groups optionally substituted, aryl groups optionally substituted;

or, when Y represents a —N—$R_4$ group, $R_2$ and $R_4$ can be optionally bound to each other so as to form, together with the other atoms to which they are bound, a saturated, unsaturated or aromatic cycle containing from 3 to 6 carbon atoms, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;

$X_1$, $X_2$ and $X_3$, equal to or different from each other, represent a halogen atom such as, for example, chlorine, bromine, iodine; or they are selected from linear or branched $C_1$-$C_{20}$, preferably $C_1$-$C_{15}$, alkyl groups, —OCOR$_5$ or —OR$_5$ groups wherein $R_5$ is selected from linear or branched $C_1$-$C_{20}$, preferably $C_1$-$C_{15}$, alkyl groups.

For the aim of the present description and of the following claims, the definitions of the numerical intervals always include the extremes, unless otherwise specified.

For the aim of the present description and of the following claims, the term "metal belonging to the family of lanthanides" means any metal belonging to the Periodic Table of the Elements having an atomic number ranging from 57 to 71.

It should be noted that, for the purposes of the present invention and following claims, the term "Periodic Table of the Elements" refers to the IUPAC version of the "Periodic Table of the Elements" dated Jun. 22, 2007, provided in the following Internet website www.iupac.org/reports/periodic table.

The term "$C_1$-$C_{20}$ alkyl groups" refers to linear or branched alkyl groups having from 1 to 20 carbon atoms. Specific examples of $C_1$-$C_{20}$ alkyl groups are: methyl, ethyl, n-propyl, iso-propyl, n-butyl, sec-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "cycloalkyl groups" refers to cycloalkyl groups having from 3 to 30 carbon atoms. Said cycloalkyl groups can be optionally substituted with one or more groups, equal to or different from each other, selected from: halogen atoms; hydroxyl groups; $C_1$-$C_{12}$ alkyl groups; $C_1$-$C_{12}$ alkoxyl groups; cyano groups; amino groups; nitro groups. Specific examples of cycloalkyl groups are: cyclopropyl, 2,2-difluorocyclopropyl, cyclobutyl, cyclopentyl, cyclohexyl, hexamethyl-cyclohexyl, pentamethylcyclopentyl, 2-cyclooctylethyl, methylcyclohexyl, methoxycyclohexyl, fluorocyclohexyl, phenylcyclohexyl.

The term "aryl groups" means aromatic carbocyclic groups. Said aromatic carbocyclic groups can be optionally substituted with one or more groups, equal to or different from each other, selected from: halogen atoms such as, for example, fluorine, chlorine, bromine, preferably fluorine; hydroxyl groups; $C_1$-$C_{12}$ alkyl groups; $C_1$-$C_{12}$ alkoxyl groups, cyano groups; amino groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

The term "cyclo" relates to a system containing a ring containing from 3 to 6 carbon atoms, optionally containing, in addition to the nitrogen atom, other heteroatoms selected from nitrogen, oxygen, sulfur, silicon, selenium, phosphorous. Specific examples of cyclo are: pyridine, thiadiazole.

According to a preferred embodiment of the present invention, in said oxo-nitrogenated complex of lanthanides having general formula (I):

Ln is neodymium (Nd), praseodymium (Pr), gadolinium (Gd), lanthanum (La), preferably neodymium (Nd);

$R_1$ and $R_2$, the same as each other, are a hydrogen atom; or they are selected from linear or branched $C_1$-$C_{20}$ alkyl groups, and are preferably a methyl group; or they are selected from cycloalkyl groups optionally substituted;

$R_3$ is selected from linear or branched $C_1$-$C_{20}$ alkyl groups, phenyl groups optionally substituted, cycloalkyl groups optionally substituted;

$X_1$, $X_2$ and $X_3$, the same as each other, are a halogen atom such as, for example, chlorine, bromine, iodine, preferably chlorine.

According to a preferred embodiment of the present invention, in said oxo-nitrogenated complex of lanthanides having general formula (II):

Ln is neodymium (Nd), praseodymium (Pr), gadolinium (Gd) lanthanum (La), preferably neodymium (Nd);

$R_1$ and $R_2$, the same as each other, are a hydrogen atom; or they are selected from linear or branched $C_1$-$C_{20}$ alkyl groups, and are preferably a methyl group; or they are selected from cycloalkyl groups optionally substituted;

Y is an oxygen atom; or a —N—$R_4$ group wherein $R_4$ is selected from linear or branched $C_1$-$C_{20}$ alkyl groups, phenyl groups optionally substituted, cycloalkyl groups optionally substituted;

$X_1$, $X_2$ and $X_3$, the same as each other, are a halogen atom such as chlorine, bromine, iodine, preferably chlorine.

The oxo-nitrogenated complex of lanthanides having general formula (I) or (II) is intended, according to the present invention, as being in any physical form such as, for example, isolated and purified solid form, solvated form with a suitable solvent, or supported on suitable organic or inorganic solids, preferably having a physical granular or powder form.

The oxo-nitrogenated complex of lanthanides having general formula (I) or (II) is prepared starting from ligands known in the art.

Specific examples of ligands which can be used for the aim of the present invention are those having the following formulae (L1)-(L13):

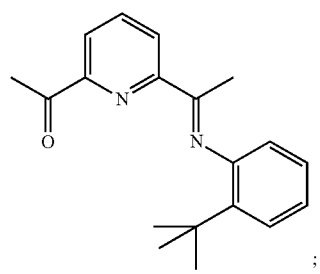
(L1)

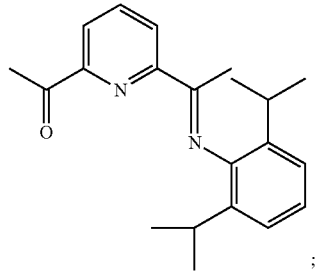
(L2)

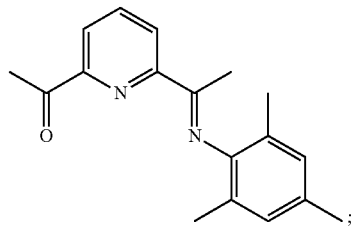
(L3)

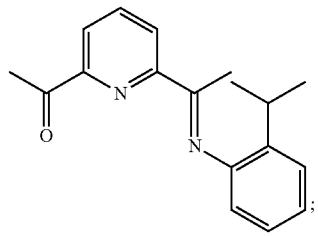
(L4)

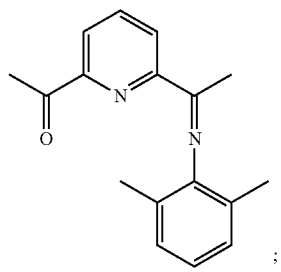
(L5)

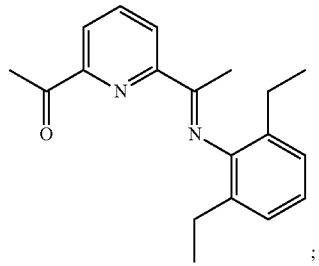
(L6)

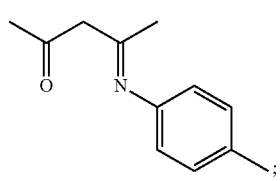
(L7)

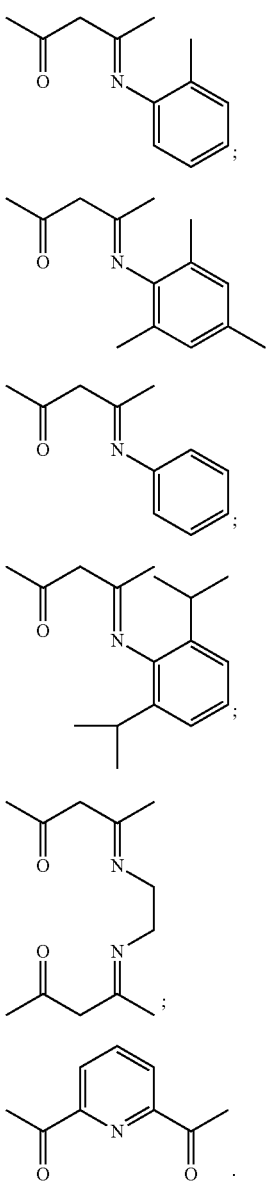

Said ligands having formulae (L1)-(L12), can be prepared by means of processes known in the art. Said ligands having formulae (L1)-(L12) can be prepared, for example, by means of condensation reactions between primary amines and diketones as described, for example, in International patent application WO 2001/10875; or by: Parks J. E. and Holm R. H. in "Inorganic Chemistry" (1968), Vol 7 (7), pages 1408-1416; Roberts E. and Turner E. E. in "Journal of Chemical Society" (1927), page 1832; Dudek G. O. and Holm R. H. in "Journal of the American Chemical Society" (1961), Vol. 83, Issue 9, pages 2099-2104. The ligand (L13), i.e. 2,6-di-acetylpyridine, is commercially available (Aldrich).

The oxo-nitrogenated complex of lanthanides having general formula (I) or (II) can be prepared according to processes known in the art for the preparation of analogous complexes of other metals such as, for example, cobalt, nickel. Said oxo-nitrogenated complex of lanthanides can be prepared, for example, by reaction between compounds of lanthanides having general formula $Ln(X)_3$ wherein Ln and X have the same meanings described above, as such or complexed with ethers [for example, diethyleter, tetrahydrofuran (THF), dimethoxyethane], with ligands having formulae (L1)-(L13) indicated above, in a molar ratio ligand (L)/lanthanide (Ln) ranging from 1 to 1.5, preferably operating in the presence of at least one ether solvent [for example, tetrahydrofuran (THF)], at room temperature or higher. The oxo-nitrogenated complex of lanthanides thus obtained can be subsequently recovered by means of methods known in the art such as, for example, precipitation by means of a non-solvent (for example, pentane), followed by separation by filtration or decanting and optional subsequent solubilization in a suitable solvent followed by low-temperature crystallization.

For the aim of the present description and of the following claims, the phrase "room temperature" means a temperature ranging from 20° C. to 25° C.

As specified above, the present invention also relates to a catalytic system for the (co)polymerization of conjugated dienes comprising said oxo-nitrogenated complex of lanthanides having general formula (I) or (II).

A further object of the present invention therefore relates to a catalytic system for the (co)polymerization of conjugated dienes comprising:

(a) at least one oxo-nitrogenated complex of lanthanides having general formula (I) or (II);
(b) at least one co-catalyst selected from:
($b_1$) aluminium alkyls having general formula (III)

$$Al(X')_n(R_6)_{3-n} \quad (III)$$

wherein X' represents a halogen atom such as, for example, chlorine, bromine, iodine, fluorine; $R_6$ is selected from linear or branched $C_1$-$C_{20}$ alkyl groups, $C_3$-$C_{20}$ cycloalkyl groups, aryl groups, said groups being optionally substituted with one or more silicon or germanium atoms; and n is an integer ranging from 0 to 2;

($b_2$) aluminoxanes having general formula (IV):

$$(R_7)_2—Al—O—[—Al(R_8)—O—]_p—Al—(R_9)_2 \quad (IV)$$

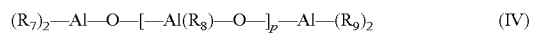

wherein $R_7$, $R_8$ and $R_9$, equal to or different from each other, represent a hydrogen atom, a halogen atom such as, for example, chlorine, bromine, iodine, fluorine; or they are selected from linear or branched $C_1$-$C_{20}$ alkyl groups, $C_3$-$C_{20}$ cycloalkyl groups, aryl groups, said groups being optionally substituted with one or more silicon or germanium atoms; and p is an integer ranging from 0 to 1000;

($b_3$) compounds having general formula (V):

$$D^+E^- \quad (V)$$

wherein $D^+$ represents a Brønsted acid capable of donating a proton and of reacting irreversibly with the substituent X of the oxo-nitrogenated complex of lanthanides having general formula (I) or (II); $E^-$ represents a compatible anion capable of stabilizing the active catalytic species which are generated by the reaction of the two components and which is sufficiently labile as to be able to be removed by an olefinic monomer, preferably a boron atom, even more preferably an anion having formula $B(Ar)_4^{(-)}$ wherein the substituents Ar, equal to or different from each other, are selected from aryl groups such as, for example, phenyl, pentafluoro-phenyl, bis(trifluoromethyl)phenyl.

Specific examples of aluminium alkyls ($b_1$) which are particularly useful for the aim of the present invention are: tri-methyl-aluminium, tri-(2,3,3-tri-methyl-butyl)-aluminium, tri-(2,3-di-methyl-hexyl)-aluminium, tri-(2,3-di-methyl-butyl)-aluminium, tri-(2,3-di-methyl-pentyl)-aluminium, tri- (2,3-di-methyl-heptyl)-aluminium, tri-(2-methyl-3-ethyl-pentyl)-aluminium, tri-(2-methyl-3-ethyl-hexyl)-aluminium, tri-(2-methyl-3-ethyl-heptyl)-aluminium, tri-(2-methyl-3-propylhexyl)-aluminium, tri-ethyl-aluminium, tri-(2-ethyl-3-methyl-butyl)-aluminium, tri-(2-ethyl-3-methyl-pentyl)-aluminium, tri-(2,3-di-ethyl-pentyl-aluminium), tri-n-propyl-aluminium, tri-iso-propyl-aluminium, tri-(2-propyl-3-methyl-butyl)-aluminium, tri-(2-iso-propyl-3-methyl-butyl)-aluminium, tri-n-butyl-aluminium, tri-iso-butyl-aluminium (TIBA), tri-tert-butyl-aluminium, tri-(2-iso-butyl-3-methyl-pentyl)-aluminium, tri(2,3,3-tri-methyl-pentyl)-aluminium, tri-(2,3,3-tri-methyl-hexyl)-aluminium, tri-(2-ethyl-3,3-di-methyl-butyl)-aluminium, tri-(2-ethyl-3,3-di-methyl-pentyl)-aluminium, tri-(2-iso-propyl-3,3-dimethyl-butyl)-aluminium, tri-(2-tri-methylsilyl-propyl)-aluminium, tri-2-methyl-3-phenyl-butyl)-aluminium, tri-(2-ethyl-3-phenyl-butyl)-aluminium, tri-(2,3-di-methyl-3-phenyl-butyl)-aluminium, tri-(2-phenyl-propyl)-aluminium, tri-[2-(4-fluoro-phenyl)-propyl]-aluminium, tri-[2-(4-chloro-phenyl)-propyl]-aluminium, tri-[2-(3-iso-propylphenyl-tri-(2-phenyl-butyl)-aluminium, tri-(3-methyl-2-phenyl-butyl)-aluminium, tri-(2-phenyl-pentyl)-aluminium, tri-[2-(penta-fluoro-phenyl)-propyl]-aluminium, tri-(2,2-diphenyl-ethyl]-aluminium, tri-(2-phenyl-methyl-propyl)-aluminium, tri-pentyl-aluminium, tri-hexyl-aluminium, tri-cyclohexyl-aluminium, trioctyl-aluminium, di-ethyl-aluminium hydride, di-n-propyl-aluminium hydride, di-n-butyl-aluminium hydride, di-iso-butyl-aluminium hydride (DIBAH), di-hexyl-aluminium hydride, di-iso-hexyl-aluminium hydride, dioctyl-aluminium hydride, di-iso-octyl-aluminium hydride, ethyl-aluminium di-hydride, n-propyl-aluminium di-hydride, iso-butyl-aluminium di-hydride, di-ethyl-aluminium chloride, mono-ethyl-aluminium dichloride, di-methyl-aluminium chloride, di-isobutyl-aluminium chloride, iso-butyl-aluminium dichloride, ethyl-aluminium sesquichloride, and also the corresponding compounds in which one of the hydrocarbon substituents is substituted with a hydrogen atom and those in which one or two of the hydrocarbon substituents are substituted with an iso-butyl group. Tri-iso-butyl-aluminium (TIBA), di-iso-butyl-aluminium hydride (DIBAH), are particularly preferred.

Specific examples of aluminoxanes ($b_2$) which are particularly useful for the aim of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TDMBAO). Methylaluminoxane (MAO), tetra-iso-butyl-aluminoxane (TIBAO), are particularly preferred. Said aluminoxanes can be prepared according to processes known in the art. Said aluminoxanes can be prepared, for example, by reacting at least one tri-alkyl-aluminium or at least one di-alkyl aluminium monochloride with water or with a salt containing crystallization water such as, for example, copper sulfate pentahydrate, aluminium sulfate hexadecahydrate, in the presence of at least one organic solvent such as, for example benzene, toluene, xylene.

Specific examples of compounds ($b_3$) having general formula (V) which are particularly useful for the aim of the present invention are: tetrakis-pentafluorophenyl-borate tributylammonium-tetrakis-pentafluorophenyl-aluminate, tributylammonium-tetrakis-[(3,5-di-(trifluorophenyl)]-borate, tributylammonium-tetrakis-(4-fluorophenyl)]-borate, N,N-dimethylbenzylammonium-tetrakis-pentafluorophenyl-borate, N,N-di-methyl-hexylammonium-tetrakis-pentafluorophenyl-borate, N,N-dimethylanilinium-tetrakis-(pentafluorophenyl)borate, N,N-dimethylanilinium-tetrakis-(pentafluorophenyl)-aluminate, di-(propyl)-ammonium-tetrakis-(pentafluorophenyl)-borate, di-(cyclohexyl) ammonium-tetrakis-(pentafluorophenyl)-borate, triphenyl-carbenium-tetrakis-(pentafluorophenyl)-borate, tri-phenylcarbenium-tetrakis-(penta-fluorophenyl)-aluminate. Tetrakis-pentafluorophenyl-borate is preferred.

Alternatively, the compounds ($b_3$) can be selected from compounds having formula $B(Ar)_3$ wherein Ar has the same meanings described above; or from compounds having formula $B(Ar)_3P$ wherein Ar has the same meanings described above and P is a pyrrole radical optionally substituted.

Further details relating to aluminium alkyls ($b_1$), aluminoxanes ($b_2$) and compounds ($b_3$), can be found in international patent application WO 2011/061151.

For the aim of the present description and of the following claims, the term "moles" and "molar ratio" are used with reference to compounds consisting of molecules and also with reference to atoms and ions, omitting, for the latter, the terms gram atom or atomic ratio, even if scientifically more correct.

According to a preferred embodiment of the present invention, in said catalytic system, the molar ratio between the lanthanide present in the oxo-nitrogenated complex of lanthanides (a) having general formula (I) or (II) and the aluminium present in the co-catalyst (b) selected from aluminium alkyls ($b_1$) or aluminoxanes ($b_2$), can range from 5 to 5,000, preferably from 10 to 1,000.

According to a preferred embodiment of the present invention, in said catalytic system, the molar ratio between the lanthanide present in the oxo-nitrogenated complex of lanthanides (a) having general formula (I) or (II) and the boron present in the co-catalyst (b) selected from compounds ($b_3$) having general formula (IV), can range from 0.1 to 15, preferably from 0.5 to 10.

For the aim of the present invention, other additives or components can be optionally added to the above catalytic system in order to adapt it so as to satisfy specific practical requirements. The catalytic systems thus obtained should therefore be considered as being included in the scope of the present invention. Additives and/or components which can be added in the preparation and/or formulation of the catalytic system object of the present invention are, for example, inert solvents, such as, for example, aliphatic and/or aromatic hydrocarbons; aliphatic and/or aromatic ethers; weakly coordinating additives (e.g. Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared according to methods known in the art.

Said catalytic system, for example, can be prepared separately (preformed) and subsequently introduced into the (co) polymerization environment. In this respect, said catalytic system can be prepared by reacting at least one oxo-nitrogenated complex of lanthanides (a) having general formula (I) or (II) with at least one co-catalyst (b), optionally in the presence of other additives or components selected from those listed above, in the presence of a solvent such as, for example, toluene, heptane, at a temperature ranging from 20° C. to 60° C., for a time ranging from 10 seconds to 10 hours, preferably from 30 seconds to 5 hours. More details on the preparation of said catalytic system can be found in the examples provided hereunder.

Alternatively, said catalytic system can be prepared in situ, i.e. directly in the (co)polymerization environment. In this respect, said catalytic system can be prepared by introducing the oxo-nitrogenated complex of lanthanides (a) having general formula (I) or (II), the co-catalyst (b) and the preselected conjugated diene(s) to be (co)polymerized, separately, operating under the conditions in which the (co)polymerization is carried out.

For the aim of the present invention, the above catalytic systems can also be supported on inert solids, preferably consisting of silicon and/or aluminium oxides, such as, for example, silica, alumina or silico-aluminates. The known supporting techniques can be used for supporting said catalytic systems, generally comprising the contact, in a suitable inert liquid medium, between the carrier, optionally activated by heating to temperatures higher than 200° C., and one or both of components (a) and (b) of the catalytic system object of the present invention. For the aim of the present invention, it is not necessary for both components to be supported, as the oxo-nitrogenated complex of lanthanides (a) having general formula (I) or (II) only, or the co-catalyst (b) only, can be present on the surface of the carrier. In the latter case, the missing component on the surface is subsequently put in contact with the supported component, at the moment in which the catalyst active for the polymerization is to be formed.

The oxo-nitrogenated complex of lanthanides having general formula (I) or (II), and the catalytic systems based thereon, which have been supported on a solid by the functionalization of the latter and the formation of a covalent bond between the solid and the oxo-nitrogenated complex of lanthanides having general formula (I) or (II), are also included in the aim of the present invention.

The present invention also relates to a process for the (co)polymerization of conjugated dienes, characterized in that it uses said catalytic system.

The quantity of oxo-nitrogenated complex of lanthanides (a) having general formula (I) or (II) and of co-catalyst (b) that can be used in the (co)polymerization of conjugated dienes varies according to the (co)polymerization process to be carried out. Said quantity is in any case such as to obtain a molar ratio between the lanthanide present in the oxo-nitrogenated complex of lanthanides (a) having general formula (I) or (II) and the metal present in the co-catalyst (b), i.e. aluminium when the co-catalyst (b) is selected from aluminium alkyls ($b_1$) or aluminoxanes ($b_2$), boron when the co-catalyst (b) is selected from compounds ($b_3$) having general formula (V), comprised within the values indicated above.

Specific examples of conjugated dienes which can be (co)polymerized using the catalytic system according to the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. Preferred (co)polymerizable conjugated dienes are 1,3-butadiene, isoprene. The above (co)polymerizable conjugated dienes can be used alone, or in a mixture of two or more dienes. In the latter case, i.e. using a mixture of two or more dienes, a copolymer is obtained.

According to a particularly preferred embodiment, the present invention relates to a polymerization process of 1,3-butadiene or isoprene, characterized in that it uses said catalytic system.

Said (co)polymerization is generally carried out in the presence of a polymerization solvent generally selected from inert organic solvents such as, for example, saturated aliphatic hydrocarbons such as, for example, butane, pentane, hexane, heptane, or mixtures thereof; saturated cyclo-aliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. The (co)polymerization solvent is preferably selected from saturated aliphatic hydrocarbons.

Alternatively, said (co)polymerization can be carried out using, as (co)polymerization solvent, the same conjugated diene(s) to be (co)polymerized, according to the process known as "bulk process".

The concentration of conjugated diene to be (co)polymerized in said (co)polymerization solvent generally ranges from 5% by weight to 50% by weight, preferably from 10% by weight to 20% by weight, with respect to the total weight of the conjugated diene/solvent mixture.

Generally, said (co)polymerization can be carried out at a temperature ranging from −70° C. to +100° C., preferably from −20° C. to +80° C.

As far as the pressure is concerned, it is preferable to operate at the pressure of the components of the mixture to be (co)polymerized.

Said (co)polymerization can be carried out either in continuous or batchwise.

As indicated above, the use of the oxo-nitrogenated complex of lanthanides having general formula (I) or (II) allows (co)polymers of conjugated dienes to be obtained, in particular linear or branched polybutadiene and polyisoprene, with a high content of 1,4-cis units, i.e. a content of 1,4-cis units≥99% in the case of polybutadiene, and ≥98% in the case of polyisoprene.

Some illustrative and non-limiting examples are provided hereunder for a better understanding of the present invention and for its practical embodiment.

EXAMPLES

Reagents and Materials

The reagents and materials used in the following examples of the invention are indicated in the following list, together with their optional pretreatment and their supplier:
acetylacetone (Aldrich): used as such;
aniline (Aldrich):
neodymium trichloride/tetrahydrofuran complex [$NdCl_3$(2THF)]: obtained by the extraction of neodymium trichloride ($NdCl_3$) (Strem Chemicals) with tetrahydrofuran (THF) at boiling point, as described by Yang J. H. et al., in "Macromolecules" (1982), Vol. 15(2), pages 230-233;
tetrahydrofuran (THF) (Carlo Erba, RPE): kept at reflux temperature on potassium/benzophenone and then distilled under nitrogen;
methanol (Carlo Erba, RPE): used as such;
ethanol (Carlo Erba, RPE): used as such;
formic acid (85%) (Carlo Erba, RPE): used as such;
o-toluidine (Aldrich): used as such;
2-tert-butylaniline (Aldrich): used as such;
2,4,6-trimethylaniline (Aldrich): used as such;
2,6-di-methylaniline (Aldrich): used as such;
2,6-di-isopropylaniline (Aldrich): used as such;
2-isopropylaniline (Aldrich): used as such;
ethylenediamine (Aldrich): used as such;
2,6-di-acetylpyridine (Aldrich): used as such;
2,4-pentanedione (Aldrich): used as such;

hydrochloric acid in aqueous solution at 37% (Aldrich): used as such;

toluene (Aldrich): pure, ≥99.5%, distilled on sodium (Na) in an inert atmosphere;

1,3-butadiene (Air Liquide): pure, ≥99.5%, evaporated from the container before each production, dried by passing it through a column packed with molecular sieves and condensed inside the reactor pre-cooled to −20° C.;

isoprene (Aldrich): pure, ≥99%, refluxed on calcium hydride, then distilled "trap-to-trap" and kept in a nitrogen atmosphere;

tetra-iso-butyl-aluminoxane (TIBAO) (Akzo Nobel): cyclohexane solution at 10% by weight;

methylaluminoxane (Aldrich): toluene solution at 10% by weight;

modified methylaluminoxane (Akzo Nobel): heptane solution at 7% by weight;

di-iso-butyl-aluminium hydride (DIBAH) (Aldrich): used as such;

Nd-2-ethylhexanoate [Nd(OCOC$_{17}$H$_{15}$)$_3$] (Strem): 0.05 M solution in heptane;

heptane (Aldrich): pure, ≥99%, distilled on sodium (Na) in an inert atmosphere;

pentane (Aldrich): pure, ≥99%, distilled on sodium (Na) in an inert atmosphere;

di-ethyl aluminium chloride [AlEt$_2$Cl] (Akzo Nobel): used as such;

tri-iso-butyl aluminium [TIBA] (Akzo Nobel): used as such;

deuterated tetrachloroethylene (C$_2$D$_2$Cl$_4$) (Acros): used as such;

deuterated chloroform (CDCl$_3$) (Acros): used as such.

The analysis and characterization methods indicated below were used.

Elemental Analysis a) Determination of Nd

For the determination of the weight quantity of the metal Nd in the oxo-nitrogenated complexes of lanthanides object of the present invention, an aliquot weighed exactly, operating in a dry-box under a nitrogen flow, of about 30-50 mg of sample, was placed in a platinum crucible of about 30 ml, together with a mixture of 1 ml of hydrofluoric acid (HF) at 40%, 0.25 ml of sulfuric (H$_2$SO$_4$) at 96% and 1 ml of nitric acid (HNO$_3$) at 70%. The crucible was then heated on a plate, increasing the temperature until the appearance of white sulfuric fumes (about 200° C.). The mixture thus obtained was cooled to room temperature (20° C.-25° C.), 1 ml of nitric acid (HNO$_3$) at 70% was added and the mixture was then heated until the appearance of fumes. After repeating the sequence a further two times, a limpid, almost colourless solution was obtained. 1 ml of nitric acid (HNO$_3$) and about 15 ml of water were then added, without heat, and the mixture was then heated to 80° C. for about 30 minutes. The sample thus prepared was diluted with water having a MilliQ purity up to a weight of about 50 g, weighed exactly, to obtain a solution on which analytical instrumental determination was carried out using an ICP-OES (optical detection plasma) Thermo Optek IRIS Advantage Duo spectrometer, by comparison with solutions at a known concentration. For this aim, a calibration curve was prepared for each analyte, within the range of 0 ppm-10 ppm, measuring solutions having a known titre obtained by weight dilution of certified solutions.

The solution of the sample prepared as described above was diluted again by weight so as to obtain concentrations close to those used as reference, before carrying out spectrophotometric detection. All the samples were prepared in duplicate. The results were considered acceptable if the single data of the tests in duplicate did not differ by more than 2% relative with respect to their average value.

b) Chlorine Determination

For this aim, samples of the oxo-nitrogenated complexes of lanthanides object of the present invention, about 30 mg-50 mg, were weighed exactly in 100 ml glasses in a dry-box under a stream of nitrogen. 2 g of sodium carbonate (Na$_2$CO$_3$) and, outside the dry-box, 50 ml of MilliQ water, were added. The mixture was brought to boiling point on a plate, under magnetic stirring, for about 30 minutes. It was left to cool, sulfuric acid (H$_2$SO$_4$) diluted 1/5, was added until the reaction became acid and the mixture was titrated with silver nitrate (AgNO$_3$) 0.1N with a potentiometer titrimeter.

c) Determination of Carbon, Hydrogen, Oxygen and Nitrogen

The determination of the carbon, hydrogen, oxygen and nitrogen, in the oxo-nitrogenated complexes of lanthanides object of the present invention, and also in the ligands used for the purposes of the present invention, was carried out by means of an automatic analyzer Carlo Erba Mod. 1106.

$^{13}$C-HMR and $^1$H-HMR Spectra

The $^{13}$C-HMR and $^1$H-HMR spectra were registered by means of a nuclear magnetic resonance spectrometer mod. Bruker Avance 400, using deuterated tetrachloroethylene (C$_2$D$_2$Cl$_4$) at 103° C., and hexamethyldisiloxane (HDMS) as internal standard, or using deuterated chloroform (CDCl$_3$), at 25° C., and tetramethylsilane (TMS) as internal standard. Solutions of the ligands used in the present invention or polymeric solutions having concentrations equal to 10% by weight with respect to the total weight of the solution of ligands used in the present invention or polymeric solution, respectively, were used for the aim.

The microstructure of the polymers [i.e. content of 1,4-cis units (%)] was determined by analysis of the above spectra on the basis of what is indicated in literature by Mochel, V. D., in "Journal of Polymer Science Part A-1: Polymer Chemistry" (1972), Vol. 10, Issue 4, pages 1009-1018, for polybutadiene; and by Sato, H., et al., in "Journal of Polymer Science: Polymer Chemistry Edition" (1979), Vol. 17, Issue 11, pages 3551-3558 for polyisoprene.

I.R. Spectra

The I.R. spectra (FT-IR) were registered by means of a Bruker IFS 48 spectrophotometer.

The I.R. spectra (FT-IR) of the ligands used in the present invention were obtained by dispersing the ligand to be analyzed in anhydrous potassium bromide (KBr) (disks of KBr), or in a suspension of nujol or tetramethyl silane (TMS).

The I.R. spectra (FT-IR) of the oxo-nitrogenated complexes of lanthanides object of the present invention, were obtained by dispersing the oxo-nitrogenated complex of lanthanides to be analyzed in anhydrous potassium bromide (KBr) (disks of KBr), or in a suspension of nujol.

The I.R. spectra (FT-IR) of the polymers were obtained from polymeric films on tablets of potassium bromide (KBr), said films being obtained by deposition of a solution of the polymer to be analyzed in hot o-dichlorobenzene. The concentration of the polymeric solutions analyzed was equal to 10% by weight with respect to the total weight of the polymeric solution.

Thermal Analysis (DSC)

The DSC ("Differential Scanning calorimetry") thermal analysis, for determining the melting point (T$_m$) and the crystallization temperature (T$_c$) of the polymers obtained, was carried out using a Perkin Elmer Pyris differential scanning calorimeter. For this aim, 5 mg of polymer were analyzed, with a scanning rate ranging from 1° C./min to 20° C./min, in an inert nitrogen atmosphere.

The DSC ("Differential Scanning calorimetry") thermal analysis, for determining the glass transition temperature ($T_g$) of the polymers obtained and of the natural rubber (NR), was carried out by means of the above calorimeter, using the following thermal program: isotherm for 3 minutes at +70° C.; cooling from +70° C. to −90° C. at a rate of 10° C./min; isotherm for 3 min at −90° C.; heating from −90° C. to +70° C. at a rate of 10° C./min.

Molecular Weight Determination

The determination of the molecular weight (MW) of the polymers obtained was carried out by means of GPC ("Gel Permeation Chromatography") operating under the following conditions:

Agilent 1100 pump;
I.R. Agilent 1100 detector;
PL Mixed-A columns;
solvent/eluent: tetrahydrofuran (THF);
flow-rate: 1 ml/min;
temperature: 25° C.;
molecular mass calculation: Universal Calibration method.

The weight average molecular weight ($M_w$) and polydispersity Index (PDI) corresponding to the $M_w/M_n$ ratio ($M_n$=number average molecular weight), are specified.

Determination of the Branching

The determination of the branching of the polymers obtained was carried out by means of the GPC/MALLS technique obtained by coupling a multi-angle light scattering detector (MALLS) with a traditional SEC/RI elution system, operating under the following conditions:

Agilent 1050 pump;
I.R. Agilent 1050 detector;
MALLS Dawn-DSP Wyatt detector—Technology, λ=632.8 nm;
PL GEL Mixed-A (×4) columns;
solvent/eluent: tetrahydrofuran (THF);
flow-rate: 1 ml/min;
temperature: 25° C.

Operating as described above, the absolute measurement can be contemporaneously carried out of the molecular weight and gyration radius of the macromolecules that are separated by the chromatographic system: the quantity of light scattered from a macromolecular species in solution can in fact be used directly for obtaining its molecular weight, whereas the angular variation in the scattering is directly correlated to its average dimensions. The fundamental relation which is used is represented by the following equation (1):

$$\frac{K^*c}{R_\theta} = \frac{1}{M_w P_\theta} + 2A_2 c \quad (1)$$

wherein:
K* is the optical constant which depends on the wavelength of the light used, the refraction index (dn/dc) of the polymer, the solvent used;
$M_w$ is the weight average molecular weight;
c is the concentration of the polymeric solution;
$R_\theta$ is the intensity of the light scattered, measured at the angle θ (excess Rayleigh factor);
$P_\theta$ is the function describing the variation of the light scattered with the angle at which it is measured, for an angle θ equal to 0;
$A_2$ is the second virial coefficient.

For very low concentrations (typical of a GPC system), the equation (1) indicated above is reduced to the following equation (2):

$$\frac{K^*c}{R_\theta} = \frac{1}{M_w P_\theta} \quad (2)$$

wherein K*, c, $R_\theta$, $M_w$ and $P_\theta$, have the same meanings defined above, and by carrying out the measurement on several angles, the extrapolation to angle null of the function $K^*c/R_\theta$ in relation to $sen^2\theta/2$ directly provides the molecular weight from the intercept value and the gyration radius of the slope.

Furthermore, as this measurement is carried out for every slice of the chromatogram, it is possible to obtain a distribution of both the molecular weight and the gyration radius.

The macromolecular dimensions in solution are directly correlated to their branching degree: for the same molecular weight, the smaller the dimensions of the macromolecule with respect to the linear correspondent, the higher the branching degree will be.

Informations relating to the macrostructure of the polymer is qualitatively deduced from the value of the parameter α, which represents the slope of the curve which correlates the gyration radius with the molecular weight: when, under the same analysis conditions, this value decreases with respect to a macrostructure of the linear type, there is the presence of a polymer having a branched-type macrostructure. The typical value of the parameter α for linear polybutadiene having a high content of 1,4-cis units, in tetrahydrofuran (THF), is equal to 0.58-0.60.

Example 1

Synthesis of the Ligand Having Formula (L1)

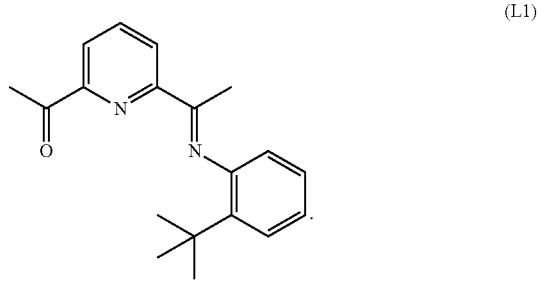 [SMILES: CC(=O)c1cccc(/C(C)=N/c2ccccc2C(C)(C)C)n1]

5.37 ml (0.036 moles) of 2-tert-butylaniline were introduced into a reaction flask together with 15 ml of methanol and 5 drops of formic acid, obtaining a solution. 30 ml of methanol containing 5.87 g (0.036 moles) of 2,6-di-acetylpyridine, were subsequently added dropwise, at room temperature, to said solution, obtaining the precipitation of a yellow microcrystalline solid: said yellow solid was recovered by filtration, washed with cold methanol and dried, under vacuum, at room temperature, obtaining 9.84 g of a light yellow solid (yield=93%) having formula (L1).

Elemental analysis [found (calculated)]: C, 78.0% (77.5%); H, 7.60% (7.53%); N, 9.65% (9.52%); O, 5.30% (5.43%).

Molecular weight (MW): 294.4.

FT-IR (nujol): 1694 cm$^{-1}$ $v_{(C=O)}$ 1644 cm$^{-1}$ $v_{(C=N)}$.

Figure 12:
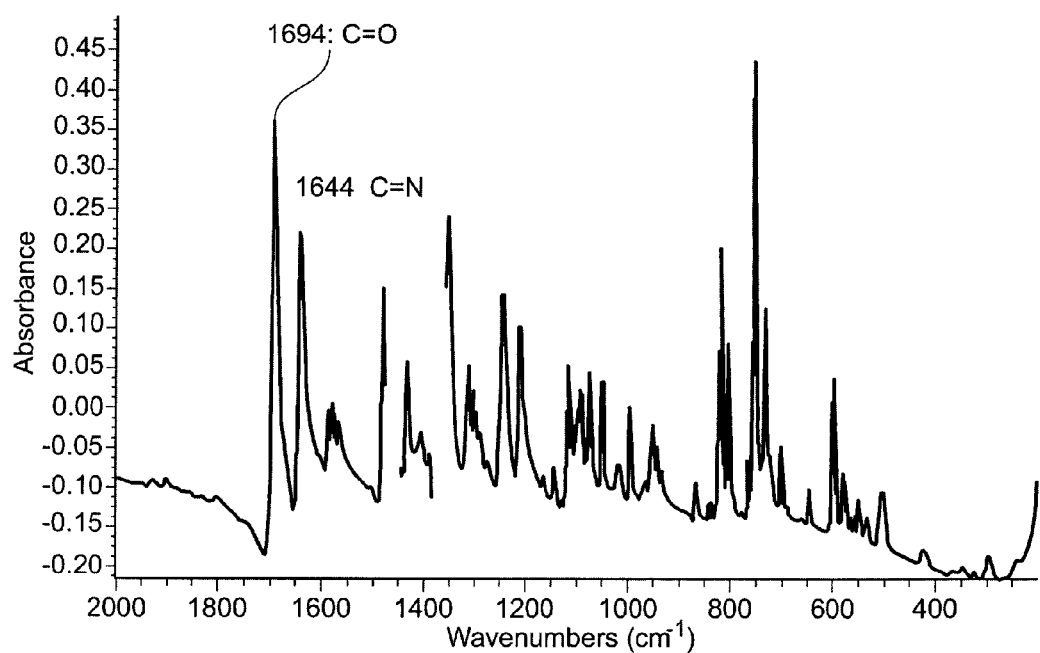
FIG. 12 illustrates FT-IR (nujol) spectrum of the ligand (L1)(Example 1).

FIG. 12 shows the FT-IR (nujol) spectrum of the ligand having formula (L1) obtained.

Example 2

Synthesis of the Ligand Having Formula (L2)

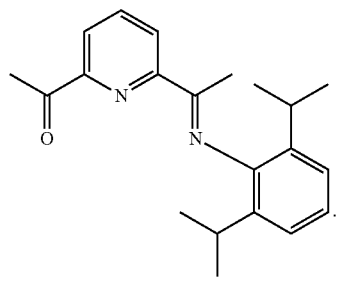
(L2)

2.70 ml (0.014 moles) of 2,6-di-iso-propylaniniline were introduced into a reaction flask together with 5 ml of methanol and 0.25 ml of formic acid, obtaining a solution. 20 ml of methanol containing 1.93 g (0.012 moles) of 2,6-di-acetylpyridine, were subsequently added dropwise, at room temperature, to said solution, obtaining the precipitation of a yellow microcrystalline solid: said yellow solid was recovered by filtration, washed with cold methanol and dried, under vacuum, at room temperature, obtaining 2.4 g of a whitish solid (yield=62%) having formula (L2).

Elemental analysis [found (calculated)]: C, 77.80% (78.22%); H, 8.24% (8.13%); N, 8.51% (8.69%); O, 4.91% (4.96%).

Molecular weight (MW): 322.45.

FT-IR (nujol): 1696 cm$^{-1}$ $v_{(C=O)}$ 1645 cm$^{-1}$ $v_{(C=N)}$.

$^1$H-NMR (δ shift from TMS): 1.16 (d, 12H), 2.27 (s, 3H), 2.73 (m, 2H), 2.80 (s, 3H), 7.17 (m, 3H), 7.95 (t, 1H), 8.15 (d, 1H), 8.57 (d, 1H).

Example 3

Synthesis of the Ligand Having Formula (L3)

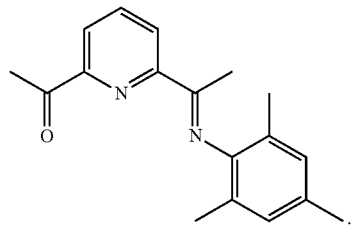
(L3)

0.80 ml (0.0057 moles) of 2,4,6-trimethylaniline were introduced into a reaction flask together with 5 ml of methanol and 2 drops of formic acid, obtaining a solution. 5 ml of methanol containing 0.937 g (0.0057 moles) of 2,6-di-acetylpyridine, were subsequently added dropwise, at room temperature, to said solution, obtaining the precipitation of a yellow microcrystalline solid: said yellow solid was recovered by filtration, washed with cold methanol and dried, under vacuum, at room temperature, obtaining 1.2 g of a light yellow solid (yield=75%) having formula (L3).

Elemental analysis [found (calculated)]: C, 77.20% (77.11%); H, 7.20% (7.19%); N, 10.0% (9.99%), O, 5.60% (5.71%).

Molecular weight (MW): 280.36.

FT-IR (nujol): 1698 cm$^{-1}$ $v_{(C=O)}$ 1637 cm$^{-1}$ $v_{(C=N)}$.

Example 4

Synthesis of the Ligand Having Formula (L4)

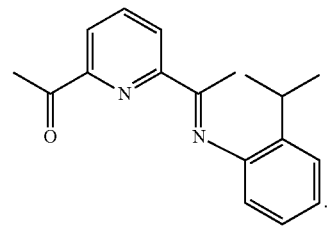
(L4)

2 g (0.012 moles) of 2,6-di-acetylpyridine were introduced into a reaction flask together with 5 ml of methanol and 5 drops of formic acid, obtaining a solution. 5 ml of methanol containing 0.80 ml (0.057 moles) of 2-iso-propylaniline, were subsequently added dropwise, at room temperature, to said solution. After 48 hours, the solution was cooled to 4° C., obtaining the precipitation of a yellow microcrystalline solid: said yellow solid was recovered by filtration, washed with cold methanol and dried, under vacuum, at room temperature, obtaining 0.9 g of a light yellow solid (yield=27%) having formula (L4).

Elemental analysis [found (calculated)]: C, 77.20% (77.14%); H, 7.19% (7.19%); N, 9.91% (9.99%); O, 5.70% (5.71%).

Molecular weight (MW): 280.37.

FT-IR (nujol): 1644 cm$^{-1}$ $v_{(C=N)}$ 1692 cm$^{-1}$ $v_{(C=O)}$.

$^1$H-NMR (δ shift from TMS): 1.19 (d, 6H), 2.40 (s, 3H), 2.79 (s, 3H), 2.99 (m, 1H), 6.66 (m, 1H), 7.17 (m, 2H), 7.33 (m, 1H), 7.94 (t, 1H), 8.13 (d, 1H), 8.53 (d, 1H).

Example 5

Synthesis of the Ligand Having Formula (L5)

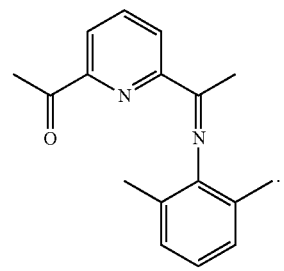
(L5)

1.18 g (0.0098 moles) of 2,6-di-methylaniline were introduced into a reaction flask together with 10 ml of methanol and 5 drops of formic acid, obtaining a solution. 10 ml of methanol containing 1.6 g (0.0098 moles) of 2,6-di-acetylpyridine, were subsequently added dropwise, at room temperature, to said solution, obtaining the precipitation of a yellowish microcrystalline solid: after 8 hours, said yellow solid was recovered by filtration, washed with cold methanol and dried, under vacuum, at room temperature, obtaining 1.7 g of a yellow solid (yield=65%) having formula (L5).

Elemental analysis [found (calculated)]: C, 76.54% (76.66%); H, 6.71% (6.81%); N, 10.65% (10.52%); O, 6.10% (6.01%).

Molecular weight (MW): 266.34.

FT-IR (nujol): 1638 cm$^{-1}$ $\nu_{(C=N)}$ 1697 cm$^{-1}$ $\nu_{(C=O)}$.

$^1$H-NMR ($\delta$ shift from TMS): 2.0 (s, 6H), 2.24 (s, 3H), 2.79 (s, 3H), 6.95 (t, 1H), 7.0 (d, 2H), 7.94 (t, 1H), 8.14 (d, 1H), 8.58 (d, 1H).

Example 6

Synthesis of the Ligand Having Formula (L6)

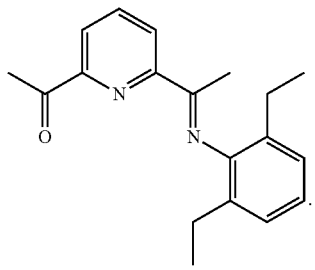

(L6)

2 g (0.012 moles) of 2,6-di-acetylpyridine were introduced into a reaction flask together with 5 ml of methanol and 5 drops of formic acid, obtaining a solution. 5 ml of methanol containing 1.34 g (0.009 moles) of 2,6-diethylaniline, were subsequently added dropwise, at room temperature, to said solution. After 48 hours, the solution was cooled to 4° C., obtaining the precipitation of a whitish microcrystalline solid: said whitish solid was recovered by filtration, washed with cold methanol and dried, under vacuum, at room temperature, obtaining 1.8 g of a whitish solid (yield=67%) having formula (L6).

Elemental analysis [found (calculated)]: C, 77.58% (77.52%); H, 7.50% (7.53%); N, 9.60% (9.52%); O, 5.30% (5.43%).

Molecular weight (MW): 294.40.

FT-IR (nujol): 1646 cm$^{-1}$ $\nu_{(C=N)}$ 1698 cm$^{-1}$ $\nu_{(C=O)}$.

Example 7

Synthesis of the Ligand Having Formula (L7)

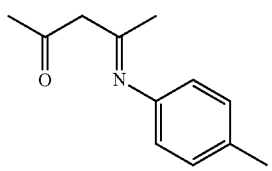

(L7)

5 g (50 mmoles) of 2,4-pentanedione were charged into a reaction flask equipped with a Dean-Stark trap for the azeotropic removal of the water, together with 75 ml of benzene, a few drops of hydrochloric acid and 5.5 g (50 mmoles) of p-toluidine: the mixture obtained was heated to reflux temperature, under nitrogen, for 24 hours. The mixture was then cooled to room temperature, filtered on a porous septum obtaining a filtrate which was evaporated under vacuum obtaining a yellow-orange oil. The oil thus obtained was dissolved in ethyl ether (10 ml) and put in a freezer for 24 hours, obtaining a solid which was filtered and dried, under vacuum, at room temperature, obtaining 6.1 g of a yellowish solid (yield=64.5%) having formula (L7).

Elemental analysis [found (calculated)]: C, 75.74% (76.16%); H, 7.98% (7.99%); N, 7.31% (7.40%); O, 8.71% (8.45%).

Molecular weight (MW): 189.25.

FT-IR (nujol): 1608 cm$^{-1}$ $\nu_{(C=N)}$ 1591 cm$^{-1}$ $\nu_{(C=O)}$.

Figure 14:
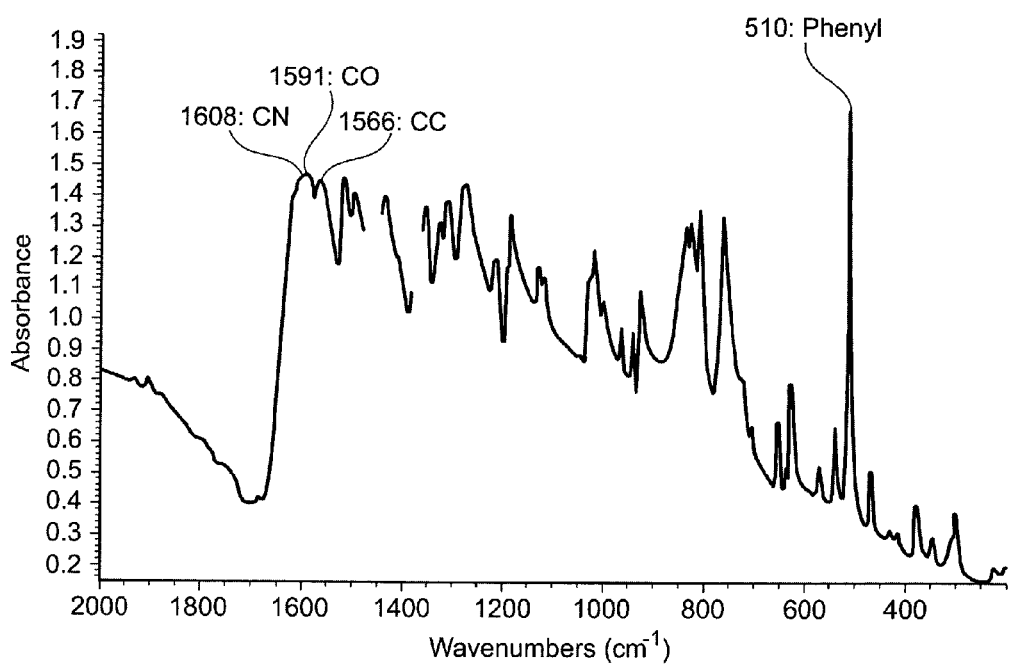
FIG. 14 illustrates FT-IR (nujol) spectrum of the ligand (L7)(Example 7).

FIG. 14 shows the FT-IR (nujol) spectrum of the ligand having formula (L7) obtained.

Example 8

Synthesis of the Ligand Having Formula (L8)

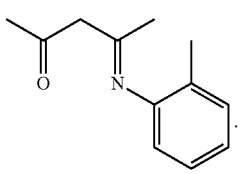

(L8)

5 g (50 mmoles) of 2,4-pentanedione were charged into a reaction flask equipped with a Dean-Stark trap for the azeotropic removal of the water, together with 75 ml of benzene, a few drops of hydrochloric acid and 5.5 g (50 mmoles) of o-toluidine: the mixture obtained was heated to reflux temperature, under nitrogen, for 24 hours. The mixture was then cooled to room temperature, filtered on a porous septum obtaining a filtrate which was evaporated under vacuum obtaining an orange oil. The oil thus obtained was dissolved in ethyl ether (10 ml) and put in a freezer for 24 hours, obtaining a solid which was filtered and dried, under vacuum, at room temperature, obtaining 5.9 g of a yellowish solid (yield=62%) having formula (L8).

Elemental analysis [found (calculated)]: C, 76.21% (76.16%); H, 7.98% (7.99%); N, 7.33% (7.40%); O, 8.61% (8.45%).

Molecular weight (MW): 189.25.

FT-IR (nujol): 1610 cm$^{-1}$ $\nu_{(C=N)}$ 1591 cm$^{-1}$ $\nu_{(C=O)}$.

Example 9

Synthesis of the Ligand Having Formula (L9)

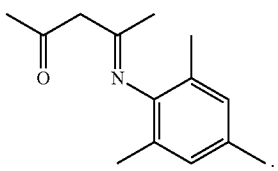

(L9)

5 g (50 mmoles) of 2,4-pentanedione were charged into a reaction flask equipped with a Dean-Stark trap for the azeotropic removal of the water, together with 75 ml of benzene, a few drops of hydrochloric acid and 6.76 g (50 mmoles) of 2,4,6-trimethylaniline: the mixture obtained was heated to reflux temperature, under nitrogen, for 24 hours. The mixture was then cooled to room temperature, filtered on a porous septum obtaining a filtrate which was evaporated under vacuum obtaining an orange oil. The oil thus obtained was dissolved in ethyl ether (10 ml) and put in a freezer for 24 hours, obtaining a solid which was recrystallized from hexane, filtered and dried, under vacuum, at room temperature, obtaining 4.8 g of a yellowish solid (yield=44%) having formula (L9).

Elemental analysis [found (calculated)]: C, 77.40% (77.38%); H, 9.0% (8.81%); N, 6.32% (6.45%); O, 7.40% (7.36%).

Molecular weight (MW): 217.31.

$^1$H NMR ($\delta$ shift from TMS): 1.60 (s, 3H), 2.07 (s, 3H), 2.14 (s, 6H), 2.25 (s, 3H), 5.17 (s, 1H), 6.87 (s, 2H), 11.82 (s, 1H).

Example 10

Synthesis of the Ligand Having Formula (L10)

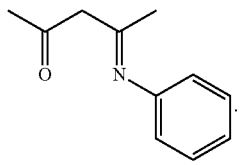

(L10)

5 g (50 mmoles) of 2,4-pentanedione were charged into a reaction flask equipped with a Dean-Stark trap for the azeotropic removal of the water, together with 75 ml of benzene, a few drops of hydrochloric acid and 4.66 g (50 mmoles) of aniline: the mixture obtained was heated to reflux temperature, under nitrogen, for 24 hours. The mixture was then cooled to room temperature, filtered on a porous septum obtaining a filtrate which was evaporated under vacuum obtaining a yellow-orange oil. The oil thus obtained was dissolved in ethyl ether (10 ml) and put in a freezer for 24 hours, obtaining a solid which was recrystallized from hexane, filtered and dried, under vacuum, at room temperature, obtaining 4.3 g of a yellowish solid (yield=49%) having formula (L10).

Elemental analysis [found (calculated)]: C, 75.2% (75.4%); H, 7.50% (7.48%); N, 8.0% (7.99%); O, 9.12% (9.13%).

Molecular weight (MW): 175.23.

FT-IR (nujol): 1610 cm$^{-1}$ $\nu_{(C=N)}$ 1591 cm$^{-1}$ $\nu_{(C=O)}$.

Example 11

Synthesis of the Ligand Having Formula (L11)

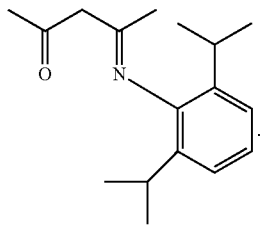

(L11)

5 g (50 mmoles) of 2,4-pentanedione were charged into a reaction flask equipped with a Dean-Stark trap for the azeotropic removal of the water, together with 75 ml of benzene, a few drops of hydrochloric acid and 8.86 g (50 mmoles) of 2,6-di-iso-propylaniline: the mixture obtained was heated to reflux temperature, under nitrogen, for 24 hours. The mixture was then cooled to room temperature, filtered on a porous septum obtaining a filtrate which was evaporated under vacuum obtaining a yellow-orange oil. The oil thus obtained was dissolved in ethyl ether (10 ml) and put in a freezer for 24 hours, obtaining a solid which was recrystallized from hexane, filtered and dried, under vacuum, at room temperature, obtaining 5.57 g of a reddish solid (yield=45%) having formula (L11).

Elemental analysis [found (calculated)]: C, 78.71% (78.72%); H, 9.69% (9.71%); N, 5.42% (5.40%); O, 6.17% (6.17%).

Molecular weight (MW): 259.39.

$^1$H NMR ($\delta$ shift from TMS): 1.12 (d, 6H), 1.19 (d, 6H), 1.61 (s, 3H), 2.10 (s, 3H), 3.00 (set, 2H), 5.19 (s, 1H), 7.15 (d, 1H), 7.27 (t, 1H), 12.03 (s, 1H).

Example 12

Synthesis of the Ligand Having Formula (L12)

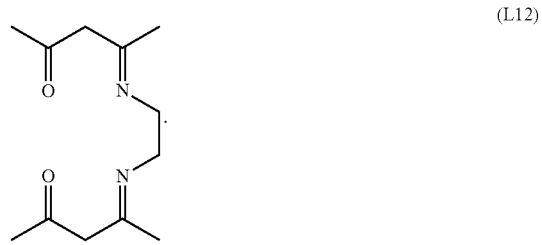 [SMILES: CC(=O)C/C(C)=N/CC/N=C(\C)CC(C)=O]

(L12)

6 g (100 mmoles) of ethylenediamine were charged into a reaction flask together with 20 ml of 2,4-pentanedione: the mixture obtained was kept under stirring, at room temperature, for 6 hours. The mixture was then put in a freezer, obtaining the precipitation of a white solid which was recrystallized from water, washed with water and dried, under vacuum, at room temperature, obtaining 22 g of a white solid (yield=98%) having formula (L12).

Elemental analysis [found (calculated)]: C, 64.30% (64.26%); H, 8.91% (8.99%); N, 12.60% (12.49%); O, 14.0% (14.27%).

Molecular weight (MW): 224.3.

Example 13

Synthesis of NdCl$_3$(L1) [Sample GL617]

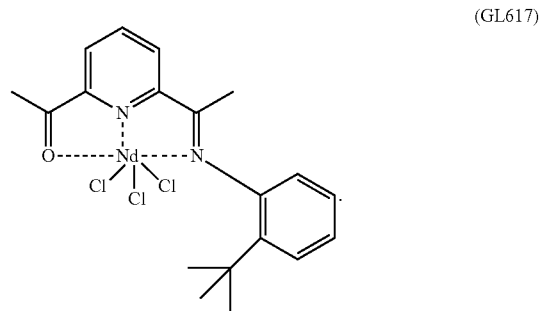

(GL617)

The complex neodymium trichloride/tetrahydrofuran [NdCl$_3$(2THF)] (0.821 g; 2.08×10$^{-3}$ moles) was introduced into a 100 ml reaction flask together with tetrahydrofuran (THF) (50 ml). The whole mixture was kept under stirring, at room temperature, for a few minutes, and the ligand having formula (L1) (0.720 g; 2.45×10$^{-3}$ moles; molar ratio L1/Nd=1.18), obtained as described in Example 1, was then added. The whole mixture was kept under stirring, at room temperature, for 7 days, obtaining a relatively homogeneous yellow/green opalescent solution. At the end of the reaction, the solution was subjected to filtration, the solvent of the filtrate was significantly reduced in volume under vacuum and pentane in excess was then added obtaining the precipitation of a yellow/green solid. The solid thus obtained was recovered by filtration and dried under vacuum obtaining 1.01 g of a greenish solid product (microcrystalline powder) corresponding to the complex NdCl$_3$(L1), equal to a conversion of 88.9% with respect to the neodymium charged.

Elemental analysis [found (calculated)]: C, 42.10% (41.87%); H, 4.20% (4.07%); N, 5.0% (5.14%); O, 3.10% (2.94%); Cl, 19.40% (19.52%); Nd, 26.30% (26.47%).

Molecular weight (MW): 544.99.

Figure 13:
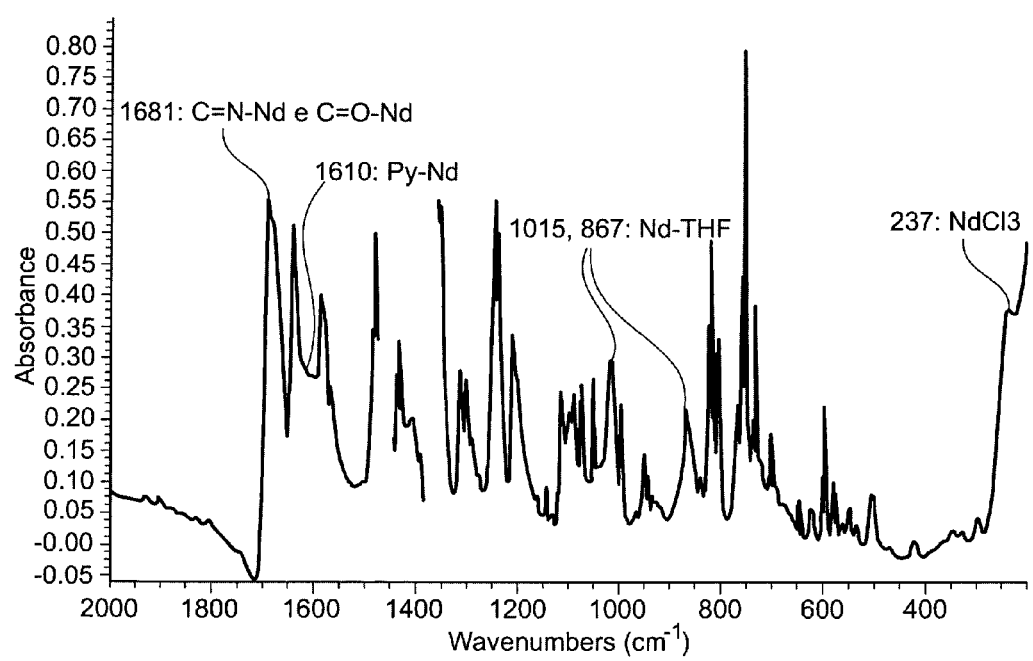
FIG. 13 illustrates FT-IR (nujol) spectrum of the complex NdCl3 (L1) (Example 13).

FT-IR (nujol): 1681 cm$^{-1}$ $\nu_{(C=N-Nd+C=O-Nd)}$; 1610 cm$^{-1}$ $\nu_{[(Py)N-Nd]}$ FIG. 13 shows the FT-IR (nujol) spectrum of the complex NdCl$_3$(L1) obtained.

Example 14

Synthesis of NdCl$_3$(L2) [Sample GL619]

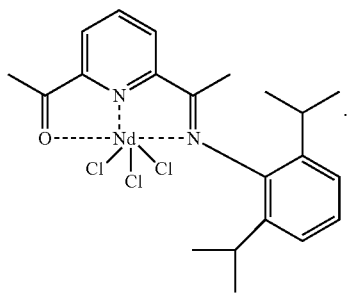

(GL619)

The complex neodymium trichloride/tetrahydrofuran [NdCl$_3$(2THF)] (0.692 g; 1.75×10$^{-3}$ moles) was introduced into a 100 ml reaction flask together with tetrahydrofuran (THF) (40 ml). The whole mixture was kept under stirring, at room temperature, for a few minutes, and the ligand having formula (L2) (0.620 g; 1.92×10$^{-3}$ moles; molar ratio L2/Nd=1.1), obtained as described in Example 2, was then added. The whole mixture was kept under stirring, at room temperature, for 7 days, obtaining a relatively homogeneous green-coloured opalescent solution. At the end of the reaction, the solution was subjected to filtration, the solvent of the filtrate was significantly reduced in volume under vacuum and pentane in excess was then added obtaining the precipitation of a greenish solid. The solid thus obtained was recovered by filtration and dried under vacuum obtaining 0.92 g of a greenish solid product (microcrystalline powder) corresponding to the complex NdCl$_3$(L2), equal to a conversion of 92% with respect to the neodymium charged.

Elemental analysis [found (calculated)]: C, 44.10% (44.01%); H, 4.70% (4.57%); N, 4.70% (4.89%); O, 2.90% (2.79%); Cl, 18.40% (18.56%); Nd, 24.90% (25.17%).

Molecular weight (MW): 573.04.

FT-IR (nujol): 1684 cm$^{-1}$ $\nu_{(C=N-Nd)}$; 1612 cm$^{-1}$ $\nu_{[(Py)N-Nd]}$.

Example 15

Synthesis of NdCl$_3$(L3) [Sample P1889]

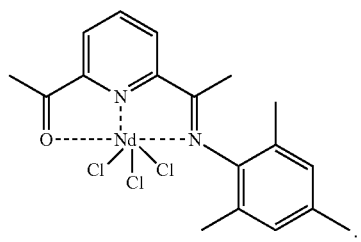

(P1889)

The complex neodymium trichloride/tetrahydrofuran [NdCl$_3$(2THF)] (0.692 g; 1.75×10$^{-3}$ moles) was introduced into a 100 ml reaction flask together with tetrahydrofuran (THF) (50 ml). The whole mixture was kept under stirring, at room temperature, for a few minutes, and the ligand having formula (L3) (0.922 g; 3.29×10$^{-3}$ moles; molar ratio L3/Nd=1.1), obtained as described in Example 3, was then added. The whole mixture was kept under stirring, at room temperature, for 5 days, obtaining a relatively homogeneous green/yellow opalescent solution. At the end of the reaction, the solution was subjected to filtration, the solvent of the filtrate was significantly reduced in volume under vacuum and pentane in excess was then added obtaining the precipitation of a yellow solid. The solid thus obtained was recovered by filtration and dried under vacuum obtaining 1.37 g of a yellow solid product (microcrystalline powder) corresponding to the complex NdCl$_3$(L3), equal to a conversion of 86.3% with respect to the neodymium charged.

Elemental analysis [found (calculated)]: C, 40.60% (40.72%); H, 3.9% (3.8%); N, 5.10% (5.28%); O, 3.10% (3.01%); Cl, 19.80% (20.03%); Nd, 27.10% (27.17%).

Molecular weight (MW): 530.96.

FT-IR (nujol): 1680 cm$^{-1}$ $\nu_{(C=N-Nd)}$; 1609 cm$^{-1}$ $\nu_{[(Py)N-Nd]}$.

Example 16

Synthesis of NdCl$_3$(L6) [Sample GL618]

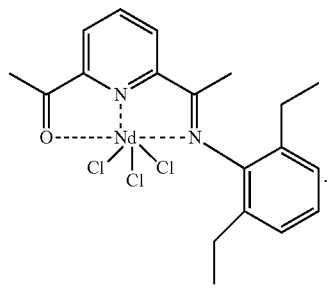

(GL618)

The complex neodymium trichloride/tetrahydrofuran [NdCl$_3$(2THF)] (0.641 g; 1.62×10$^{-3}$ moles) was introduced into a 100 ml reaction flask together with tetrahydrofuran (THF) (40 ml). The whole mixture was kept under stirring, at room temperature, for a few minutes, and the ligand having formula (L6) (0.522 g; 1.80×10$^{-3}$ moles; molar ratio L6/Nd=1.11), obtained as described in Example 6, was then added. The whole mixture was kept under stirring, at room temperature, for 7 days, obtaining a relatively homogeneous green-coloured opalescent solution. At the end of the reaction, the solution was subjected to filtration, the solvent of the filtrate was significantly reduced in volume under vacuum and pentane in excess was then added obtaining the precipitation of a yellow/green solid. The solid thus obtained was recovered by filtration and dried under vacuum obtaining 0.83 g of a yellow solid product (microcrystalline powder) corresponding to the complex NdCl$_3$(L6), equal to a conversion of 85% with respect to the neodymium charged.

Elemental analysis [found (calculated)]: C, 42.0% (41.87%); H, 4.20% (4.07%); N, 5.0% (5.14%); O, 3.10% (2.94%); Cl, 19.35% (19.52%); Nd, 26.35% (26.47%).

Molecular weight (MW): 544.99.

FT-IR (nujol): 1682 cm$^{-1}$ $\nu_{(C=N-Nd)}$; 1611 cm$^{-1}$ $\nu_{[(Py)N-Nd]}$.

Example 17

Synthesis of NdCl$_3$(L7) [Sample GL653]

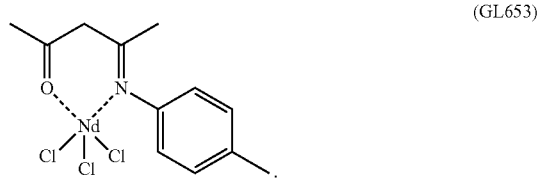

(GL653)

The complex neodymium trichloride/tetrahydrofuran [NdCl$_3$(2THF)] (1.40 g; 3.54×10$^{-3}$ moles) was introduced into a 100 ml reaction flask together with tetrahydrofuran (THF) (50 ml). The whole mixture was kept under stirring, at room temperature, for a few minutes, and the ligand having formula (L7) (0.694 g; 3.98×10$^{-3}$ moles; molar ratio L7/Nd=1.12), obtained as described in Example 7, was then added. The whole mixture was kept under stirring, at room temperature, for 5 days, obtaining a relatively homogeneous green/brown opalescent solution. At the end of the reaction, the solution was subjected to filtration, the solvent of the filtrate was significantly reduced in volume under vacuum and pentane in excess was then added obtaining the precipitation of a brownish solid. The solid thus obtained was recovered by filtration and dried under vacuum obtaining 1.22 g of a brownish solid product (microcrystalline powder) corresponding to the complex NdCl$_3$(L7), equal to a conversion of 78.5% with respect to the neodymium charged.

Elemental analysis [found (calculated)]: C, 32.90% (32.77%); H, 3.80% (3.44%); N, 2.90% (3.18%); O, 3.80% (3.64%); Cl, 23.90% (24.18%); Nd, 32.40% (32.79%).

Molecular weight (MW): 439.85.

FT-IR (nujol): 1594 cm$^{-1}$ $\nu_{(C=N-Nd)}$; 1576 cm$^{-1}$ $\nu_{(C=O-Nd)}$.

Figure 15:
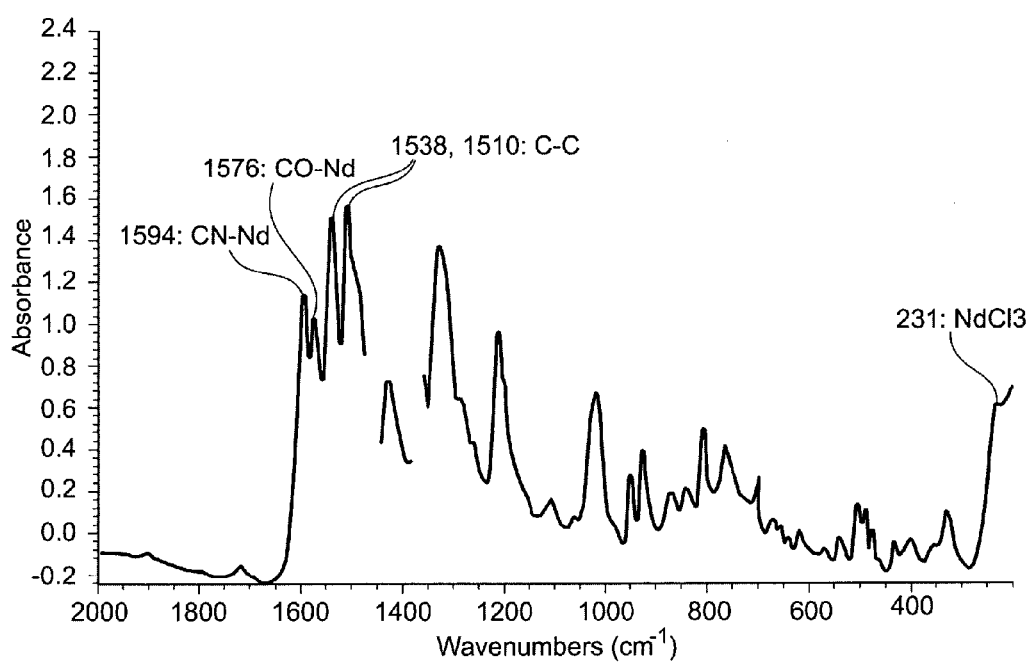
FIG. 15 illustrates FT-IR (nujol) spectrum of the complex NdCl3 (L7) (Example 17).
Figure 16:
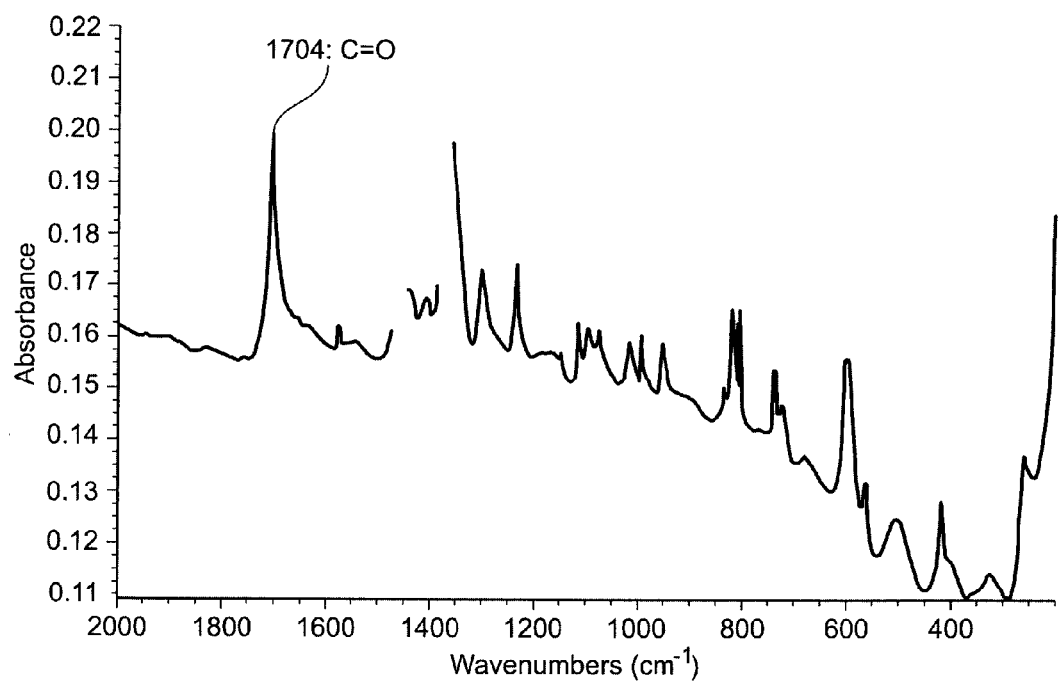
FIG. 16 illustrates FT-IR (nujol) spectrum of the ligand (L13).

FIG. 15 shows the FT-IR (nujol) spectrum of the complex NdCl$_3$(L7) obtained.

Example 18

Synthesis of NdCl$_3$(L8) [Sample GL654]

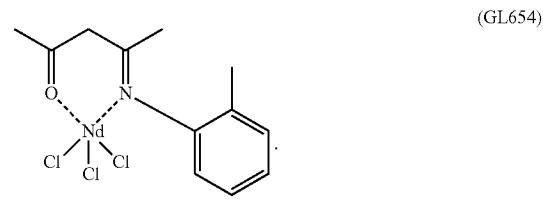

(GL654)

The complex neodymium trichloride/tetrahydrofuran [NdCl$_3$(2THF)] (1.57 g; 3.97×10$^{-3}$ moles) was introduced into a 100 ml reaction flask together with tetrahydrofuran (THF) (50 ml). The whole mixture was kept under stirring, at room temperature, for a few minutes, and the ligand having formula (L8) (0.800 g; 4.59×10$^{-3}$ moles; molar ratio L8/Nd=1.15), obtained as described in Example 8, was then added. The whole mixture was kept under stirring, at room temperature, for 4 days, obtaining a relatively homogeneous yellow/brown opalescent solution. At the end of the reaction, the solution was subjected to filtration, the solvent of the filtrate was significantly reduced in volume under vacuum and pentane in excess was then added obtaining the precipitation of a yellow/brown solid. The solid thus obtained was recovered by filtration and dried under vacuum obtaining 1.51 g of a yellowish solid product (microcrystalline powder) corresponding to the complex NdCl$_3$(L8), equal to a conversion of 86.7% with respect to the neodymium charged.

Elemental analysis [found (calculated)]: C, 32.60% (32.77%); H, 3.30% (3.44%); N, 3.30% (3.18%); O, 3.50% (3.64%); Cl, 24.0% (24.18%); Nd, 32.70% (32.79%).

Molecular weight (MW): 439.85.

FT-IR (nujol): 1595 cm$^{-1}$ $\nu_{(C=N-Nd)}$; 1571 cm$^{-1}$ $\nu_{(C=O-Nd)}$.

Example 19

Synthesis of NdCl$_3$(L12) [Sample GL810]

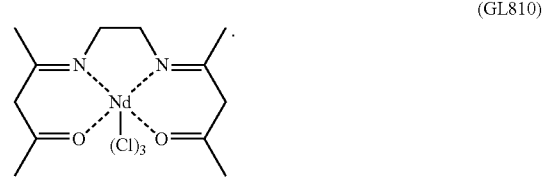

(GL810)

The complex neodymium trichloride/tetrahydrofuran [NdCl$_3$(2THF)] (1.40 g; 3.76×10$^{-3}$ moles) was introduced into a 100 ml reaction flask together with tetrahydrofuran (THF) (50 ml). The whole mixture was kept under stirring, at room temperature, for a few minutes, and the ligand having formula (L12) (0.942 g; 4.2×10$^{-3}$ moles; molar ratio L12/Nd=1.12), obtained as described in Example 12, was then added. The whole mixture was kept under stirring, at room temperature, for 5 days, obtaining a light blue suspension. At the end of the reaction, the volume was significantly reduced under vacuum, and the precipitate obtained was separated by filtration, washed various times with pentane, in order to remove the non-reacted ligand, and dried under vacuum obtaining 1.23 g of a light bluish solid product (microcrystalline powder) corresponding to the complex $NdCl_3(L12)$, equal to a conversion of 68.9% with respect to the neodymium charged.

Elemental analysis [found (calculated)]: C, 30.60% (30.35%); H, 4.50% (4.24%); N, 5.6% (5.9%); O, 6.90% (6.74%); Cl, 22.2% (22.4%); Nd, 30.10% (30.37%).

Molecular weight (MW): 474.9.

Example 20

Synthesis of $NdCl_3(L13)$ [Sample P1915]

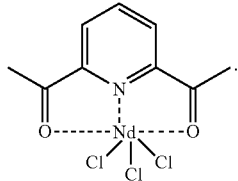

(P1915)

The complex neodymium trichloride/tetrahydrofuran [$NdCl_3(2THF)$] (0.974 g; $2.5 \times 10^{-3}$ moles) was introduced into a 100 ml reaction flask together with tetrahydrofuran (THF) (50 ml). The whole mixture was kept under stirring, at room temperature, for a few minutes, and the ligand having formula (L13) (i.e. 2,6-diacetylaniline) (0.406 g; $2.5 \times 10^{-3}$ moles; molar ratio L13/Nd=1.1) was then added. The whole mixture was kept under stirring, at room temperature, for 7 days, obtaining a relatively homogeneous yellow/green opalescent solution. At the end of the reaction, the solution was subjected to filtration, the solvent of the filtrate was significantly reduced in volume under vacuum and pentane in excess was then added obtaining the precipitation of a brownish solid. The solid thus obtained was recovered by filtration and dried under vacuum obtaining 0.69 g of a brownish solid product (microcrystalline powder) corresponding to the complex $NdCl_3(L13)$, equal to a conversion of 66.7% with respect to the neodymium charged.

Elemental analysis [found (calculated)]: C, 26.10% (26.12%); H, 2.30% (2.19%); N, 3.50% (3.39%); O, 7.85% (7.73%); Cl, 25.75% (25.70%); Nd, 34.90% (34.86%).

Molecular weight (MW): 413.77.

FT-IR (nujol): 1672 $cm^{-1}$ $\nu_{(C=O \rightarrow Nd)}$; 1597 $cm^{-1}$ $\nu_{[(Py)N \rightarrow Nd]}$.

Figure 17:
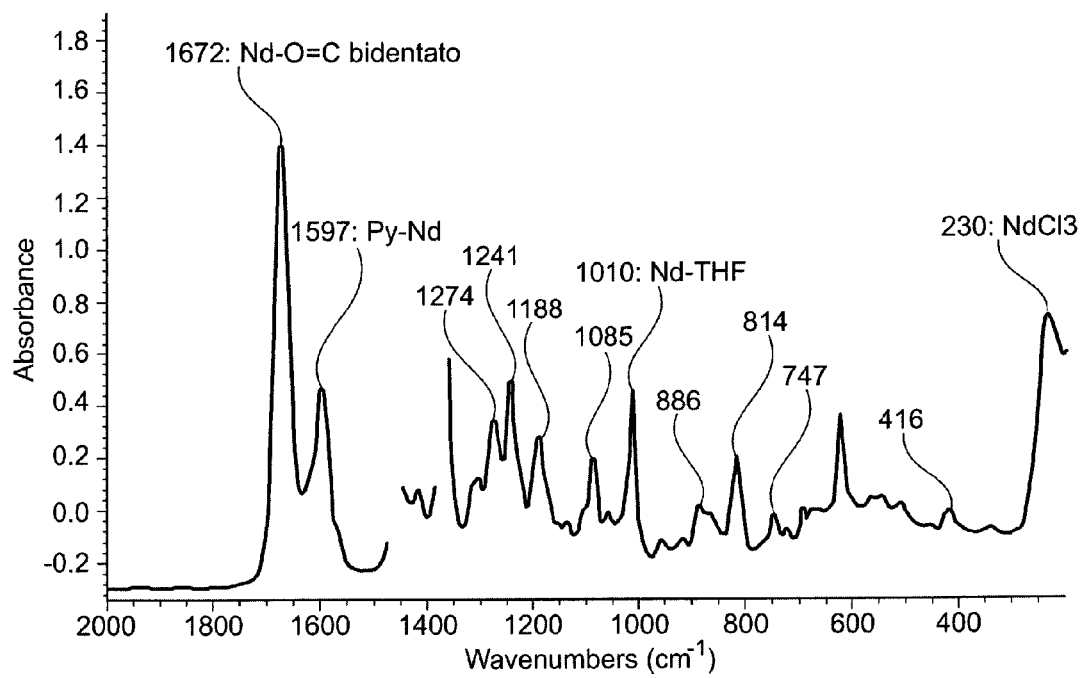
FIG. 17 illustrates FT-IR (nujol) spectrum of the complex NdCl3 (L13) (Example 20).

FIG. 17 shows the FT-IR (nujol) spectrum of the complex $NdCl_3(L13)$ obtained.

Example 21

P1917

2 ml of 1,3-butadiene, equal to about 1.4 g, were condensed, at a low temperature (−20° C.), in a 25 ml test-tube. 7.1 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L1)$ [sample GL617] (2.7 ml of a toluene solution at a concentration equal to 2 mg/ml; $1 \times 10^{-5}$ moles, equal to about 5.4 mg) obtained as described in Example 14. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.370 g of polybutadiene having a content of 1,4-cis units>99%: further characteristics of the process and of the polybutadiene obtained are indicated in Table 1.

Figure 2:
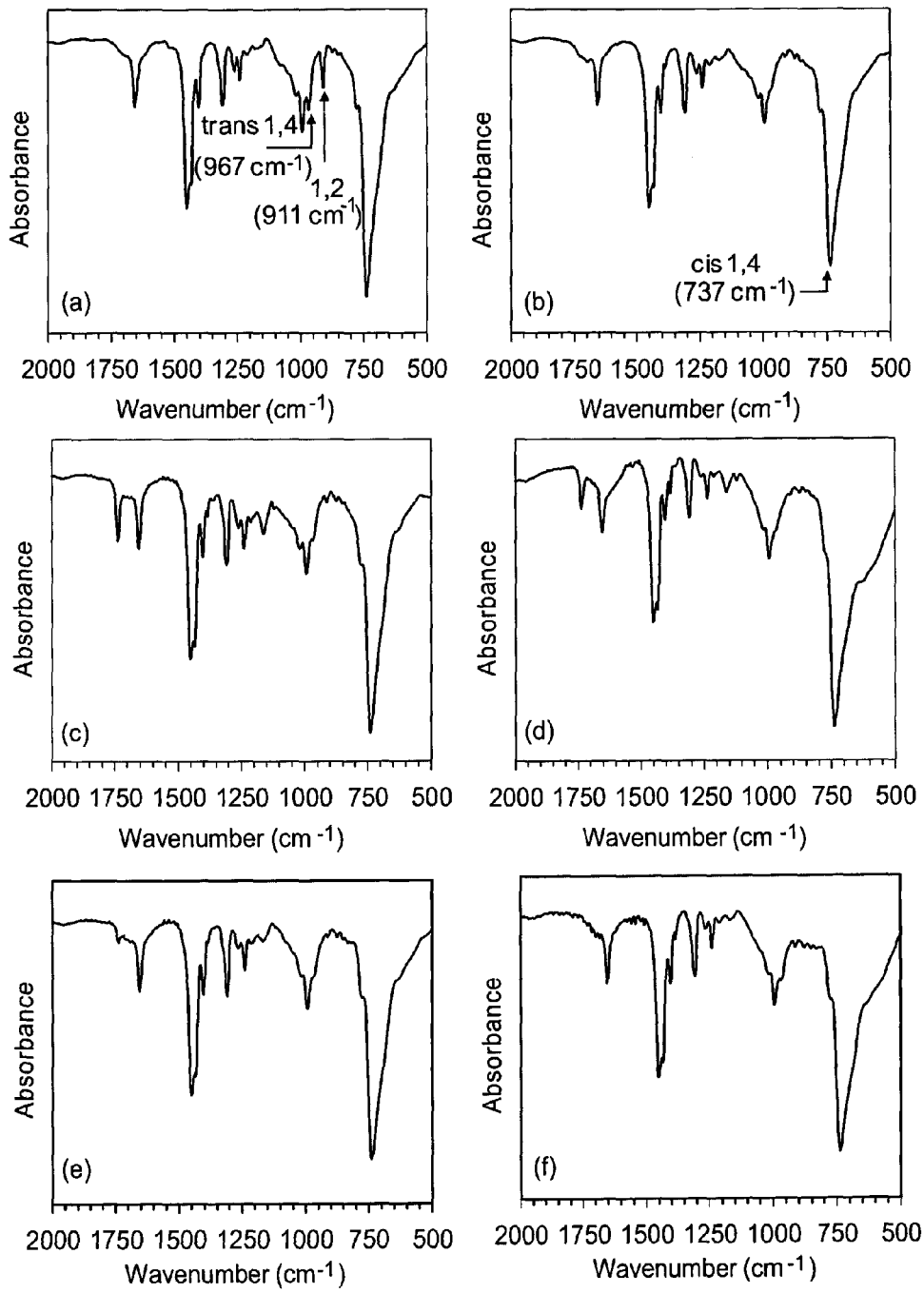
FIG. 2 illustrates FT-IR spectra of polybutadienes obtained with (a) AlEt$_2$Cl/Nd (OCOC$_7$H$_{15}$)$_3$/Al ($^i$BU)$_3$ (Table 1, Example 37); (b) NdCl$_3$(L1)TIBAO (Table 1, Example 21); (c) NdCl$_3$ (L6)/DIBAH (Table 1, Example 29); (d) NdCl$_3$ (L6)/TIBAO (Table 1, Example 28); (e) NdCl$_3$(L7)/TIBAO (Table 1, Example 31); (f) NdCl$_3$(L7)/DIBAH (Table 1, Example 32).

FIG. 2(*b*) shows the FT-IR spectrum of the polybutadiene obtained.

Example 22

P1939

2 ml of 1,3-butadiene, equal to about 1.4 g, were condensed, at a low temperature (−20° C.), in a 25 ml test-tube. 7 ml of toluene were then added and the temperature of the solution thus obtained was brought to 20° C. Methylaluminoxane (MAO) in a toluene solution (6.3 ml; $1 \times 10^{-2}$ moles, equal to about 0.58 g) was then added, and subsequently the complex $NdCl_3(L1)$ [sample GL617] (2.7 ml of a toluene solution at a concentration equal to 2 mg/ml; $1 \times 10^{-5}$ moles, equal to about 5.4 mg) obtained as described in Example 14. The whole mixture was kept, under magnetic stirring, at 20° C., for 116 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.770 g of polybutadiene having a content of 1,4-cis units>99%: further characteristics of the process and of the polybutadiene obtained are indicated in Table 1.

Example 23

P1918

2 ml of 1,3-butadiene, equal to about 1.4 g, were condensed, at a low temperature (−20° C.), in a 25 ml test-tube. 6.85 ml of heptane were then added and the temperature of the solution thus obtained was brought to 20° C. Tetra-iso-butyl-aluminoxane (TIBAO) in a cyclohexane solution (6.2 ml; $1 \times 10^{-2}$ moles, equal to about 2.9 g) was then added, and subsequently the complex $NdCl_3(L2)$ [sample GL619] (2.85 ml of a toluene solution at a concentration equal to 2 mg/ml; $1 \times 10^{-5}$ moles, equal to about 5.7 mg) obtained as described in Example 15. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.438 g of polybutadiene having a content of 1,4-cis units>99%: further characteristics of the process and of the polybutadiene obtained are indicated in Table 1.

Example 24

P1940

2 ml of 1,3-butadiene, equal to about 1.4 g, were condensed, at a low temperature (−20° C.), in a 25 ml test-tube. 6.85 ml of toluene were then added and the temperature of the solution thus obtained was brought to 20° C. Methylaluminoxane (MAO) in a toluene solution (6.3 ml; $1 \times 10^{-2}$ moles, equal to about 0.58 g) was then added, and subsequently the complex NdCl$_3$(L2) [sample GL619] (2.85 ml of a toluene solution at a concentration equal to 2 mg/ml; 1×10$^{-5}$ moles, equal to about 5.7 mg) obtained as described in Example 15. The whole mixture was kept, under magnetic stirring, at 20° C., for 116 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.808 g of polybutadiene having a content of 1,4-cis units>99%: further characteristics of the process and of the polybutadiene obtained are indicated in Table 1.

Example 25

P1919

2 ml of 1,3-butadiene, equal to about 1.4 g, were condensed, at a low temperature (−20° C.), in a 25 ml test-tube. 7.15 ml of heptane were then added and the temperature of the solution thus obtained was brought to 20° C. Tetra-iso-butyl-aluminoxane (TIBAO) in a cyclohexane solution (6.2 ml; 1×10$^{-2}$ moles, equal to about 2.9 g) was then added, and subsequently the complex NdCl$_3$(L3) [sample P1889] (2.65 ml of a toluene solution at a concentration equal to 2 mg/ml; 1×10$^{-5}$ moles, equal to about 5.3 mg) obtained as described in Example 16. The whole mixture was kept, under magnetic stirring, at 20° C., for 10 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.277 g of polybutadiene having a content of 1,4-cis units>99%: further characteristics of the process and of the polybutadiene obtained are indicated in Table 1.

Example 26

GL504

2 ml of 1,3-butadiene, equal to about 1.4 g, were condensed, at a low temperature (−20° C.), in a 25 ml test-tube. 13.17 ml of heptane were then added and the temperature of the solution thus obtained was brought to 20° C. Di-iso-butyl-aluminium hydride (DIBAH) (0.18 ml; 1 mmole, equal to about 144 mg) was then added, and subsequently the complex NdCl$_3$(L3) [sample P1889] (2.65 ml of a toluene solution at a concentration equal to 2 mg/ml; 1×10$^{-5}$ moles, equal to about 5.3 mg) obtained as described in Example 16. The whole mixture was kept, under magnetic stirring, at 20° C. for 20 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.321 g of polybutadiene having a content of 1,4-cis units>99%: further characteristics of the process and of the polybutadiene obtained are indicated in Table 1.

Example 27

GL445

2 ml of 1,3-butadiene, equal to about 1.4 g, were condensed, at a low temperature (−20° C.), in a 25 ml test-tube. 7.05 ml of toluene were then added and the temperature of the solution thus obtained was brought to 20° C. Methylaluminoxane (MAO) in a toluene solution (6.3 ml; 1×10$^{-2}$ moles, equal to about 0.58 g) was then added, and subsequently the complex NdCl$_3$(L3) [sample P1889] (2.65 ml of a toluene solution at a concentration equal to 2 mg/ml; 1×10$^{-5}$ moles, equal to about 5.3 mg) obtained as described in Example 16. The whole mixture was kept, under magnetic stirring, at 20° C., for 720 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.39 g of polybutadiene having a content of 1,4-cis units>99%: further characteristics of the process and of the polybutadiene obtained are indicated in Table 1.

Example 28

P1944

2 ml of 1,3-butadiene, equal to about 1.4 g, were condensed, at a low temperature (−20° C.), in a 25 ml test-tube. 7.05 ml of heptane were then added and the temperature of the solution thus obtained was brought to 20° C. Tetra-iso-butyl-aluminoxane (TIBAO) in a cyclohexane solution (6.2 ml; 1×10$^{-2}$ moles, equal to about 2.9 g) was then added, and subsequently the complex NdCl$_3$(L6) [sample GL618] (2.75 ml of a toluene solution at a concentration equal to 2 mg/ml; 1×10$^{-5}$ moles, equal to about 5.5 mg) obtained as described in Example 17. The whole mixture was kept, under magnetic stirring, at 20° C., for 3.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.575 g of polybutadiene having a content of 1,4-cis units equal to 99.6%: further characteristics of the process and of the polybutadiene obtained are indicated in Table 1.

FIG. 2(d) shows the FT-IR spectrum of the polybutadiene obtained.

Figure 3:
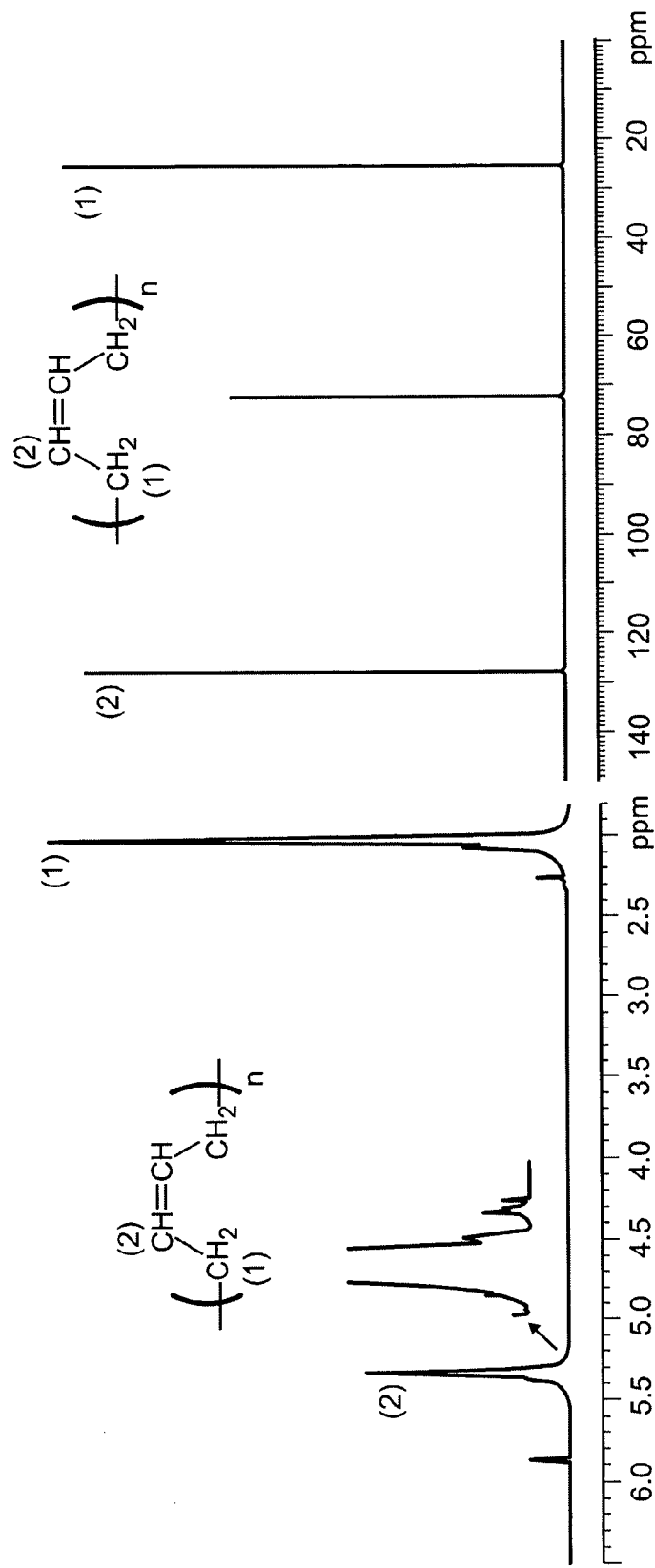
FIG. 3 illustrates $^1$H-NMR spectra (on the left) and $^{13}$C-NMR (on the right (C$_2$D$_2$Cl$_4$ as deuterated solvent, HMDS as internal standard, 103° C.) of polybutadiene obtained with NdCl$_3$(L6)/TIBAO (Table 1, Example 28) (content of 1,4-cis units equal to 99.6%).

FIG. 3 shows the $^1$H-NMR and $^{13}$C-NMR spectra of the polybutadiene obtained.

Example 29

P1945

2 ml of 1,3-butadiene, equal to about 1.4 g, were condensed, at a low temperature (−20° C.), in a 25 ml test-tube. 13.07 ml of heptane were then added and the temperature of the solution thus obtained was brought to 20° C. Di-iso-butyl-aluminium hydride (DIBAH) (0.18 ml; 1 mmole, equal to about 144 mg) was then added, and subsequently the complex NdCl$_3$(L6) [sample GL618] (2.75 ml of a toluene solution at a concentration equal to 2 mg/ml; 1×10$^{-5}$ moles, equal to about 5.5 mg) obtained as described in Example 17. The whole mixture was kept, under magnetic stirring, at 20° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.259 g of polybutadiene having a content of 1,4-cis units equal to 99.4%: further characteristics of the process and of the polybutadiene obtained are indicated in Table 1.

FIG. 2(c) shows the FT-IR spectrum of the polybutadiene obtained.

Figure 4:
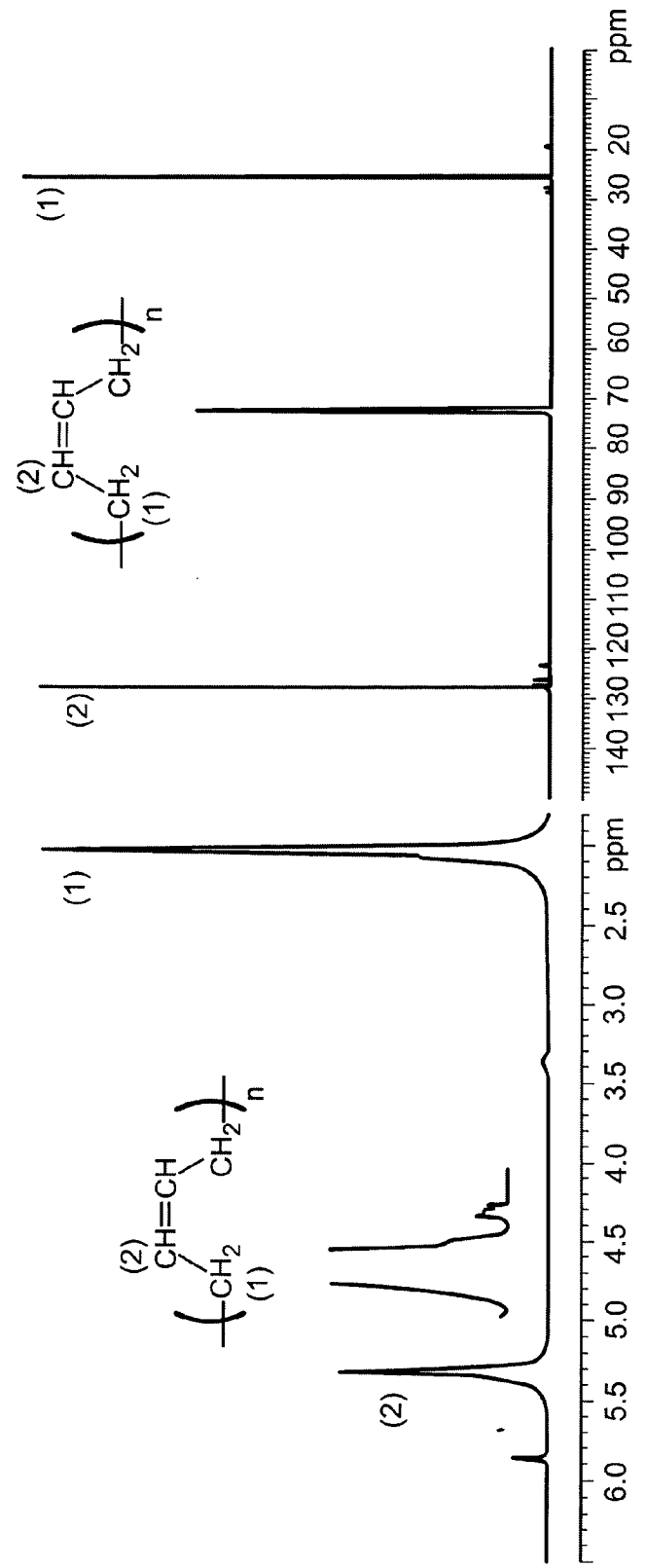
FIG. 4 illustrates $^1$H-NMR spectra (on the left) and $^{13}$C-NMR (on the right) (C$_{22}$Cl$_4$ as deuterated solvent, HMDS as internal standard, 103° C.) of polybutadiene obtained with NdCl$_3$(L6)/DIBAH (Table 1, Example 29) (content of 1,4-cis units equal to 99.4%).

FIG. 4 shows the $^1$H-NMR and $^{13}$C-NMR spectra of the polybutadiene obtained.

Example 30

P1943

2 ml of 1,3-butadiene, equal to about 1.4 g, were condensed, at a low temperature (−20° C.), in a 25 ml test-tube. 6.95 ml of toluene were then added and the temperature of the solution thus obtained was brought to 20° C. Methylaluminoxane (MAO) in a toluene solution (6.3 ml; $1\times10^{-2}$ moles, equal to about 0.58 g) was then added, and subsequently the complex $NdCl_3(L6)$ [sample GL618] (2.75 ml of a toluene solution at a concentration equal to 2 mg/ml; $1\times10^{-5}$ moles, equal to about 5.5 mg) obtained as described in Example 17. The whole mixture was kept, under magnetic stirring, at 20° C., for 24 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.214 g of polybutadiene having a content of 1,4-cis units>99%: further characteristics of the process and of the polybutadiene obtained are indicated in Table 1.

Example 31

GL728

2 ml of 1,3-butadiene, equal to about 1.4 g, were condensed, at a low temperature (−20° C.), in a 25 ml test-tube. 7.6 ml of heptane were then added and the temperature of the solution thus obtained was brought to 50° C. Tetra-iso-butyl-aluminoxane (TIBAO) in a cyclohexane solution (6.2 ml; $1\times10^{-2}$ moles, equal to about 2.9 g) was then added, and subsequently the complex $NdCl_3(L7)$ [sample GL653] (2.2 ml of a toluene solution at a concentration equal to 2 mg/ml; $1\times10^{-5}$ moles, equal to about 4.4 mg) obtained as described in Example 18. The whole mixture was kept, under magnetic stirring, at 50° C., for 1 hour. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.721 g of polybutadiene having a content of 1,4-cis units>99%: further characteristics of the process and of the polybutadiene obtained are indicated in Table 1.

FIG. 2(e) shows the FT-IR spectrum of the polybutadiene obtained.

Example 32

GL730

2 ml of 1,3-butadiene, equal to about 1.4 g, were condensed, at a low temperature (−20° C.), in a 25 ml test-tube. 13.62 ml of heptane were then added and the temperature of the solution thus obtained was brought to 50° C. Di-iso-butyl-aluminium hydride (DIBAH) (0.18 ml; 1 mmole, equal to about 144 mg) was then added, and subsequently the complex $NdCl_3(L7)$ [sample GL653] (2.2 ml of a toluene solution at a concentration equal to 2 mg/ml; $1\times10^{-5}$ moles, equal to about 4.4 mg) obtained as described in Example 18. The whole mixture was kept, under magnetic stirring, at 50° C., for 1.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.670 g of polybutadiene having a content of 1,4-cis units>99%: further characteristics of the process and of the polybutadiene obtained are indicated in Table 1.

FIG. 2(f) shows the FT-IR spectrum of the polybutadiene obtained.

Example 33

GL729

2 ml of 1,3-butadiene, equal to about 1.4 g, were condensed, at a low temperature (−20° C.), in a 25 ml test-tube. 7.6 ml of heptane were then added and the temperature of the solution thus obtained was brought to 50° C. Tetra-iso-butyl-aluminoxane (TIBAO) in a cyclohexane solution (6.2 ml; $1\times10^{-2}$ moles, equal to about 2.9 g) was then added, and subsequently the complex $NdCl_3(L8)$ [sample GL654] (2.2 ml of a toluene solution at a concentration equal to 2 mg/ml; $1\times10^{-5}$ moles, equal to about 4.4 mg) obtained as described in Example 19. The whole mixture was kept, under magnetic stirring, at 50° C., for 30 minutes. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.594 g of polybutadiene having a content of 1,4-cis units>99%: further characteristics of the process and of the polybutadiene obtained are indicated in Table 1.

Example 34

GL728

2 ml of 1,3-butadiene, equal to about 1.4 g, were condensed, at a low temperature (−20° C.), in a 25 ml test-tube. 13.6 ml of heptane were then added and the temperature of the solution thus obtained was brought to 50° C. Di-iso-butyl-aluminium hydride (DIBAH) (0.18 ml; 1 mmole, equal to about 144 mg) was then added, and subsequently the complex $NdCl_3(L8)$ [sample GL654] (2.2 ml of a toluene solution at a concentration equal to 2 mg/ml; $1\times10^{-5}$ moles, equal to about 4.4 mg) obtained as described in Example 19. The whole mixture was kept, under magnetic stirring, at 50° C., for 1 hour. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.647 g of polybutadiene having a content of 1,4-cis units equal to 99.5%: further characteristics of the process and of the polybutadiene obtained are indicated in Table 1.

Figure 5:
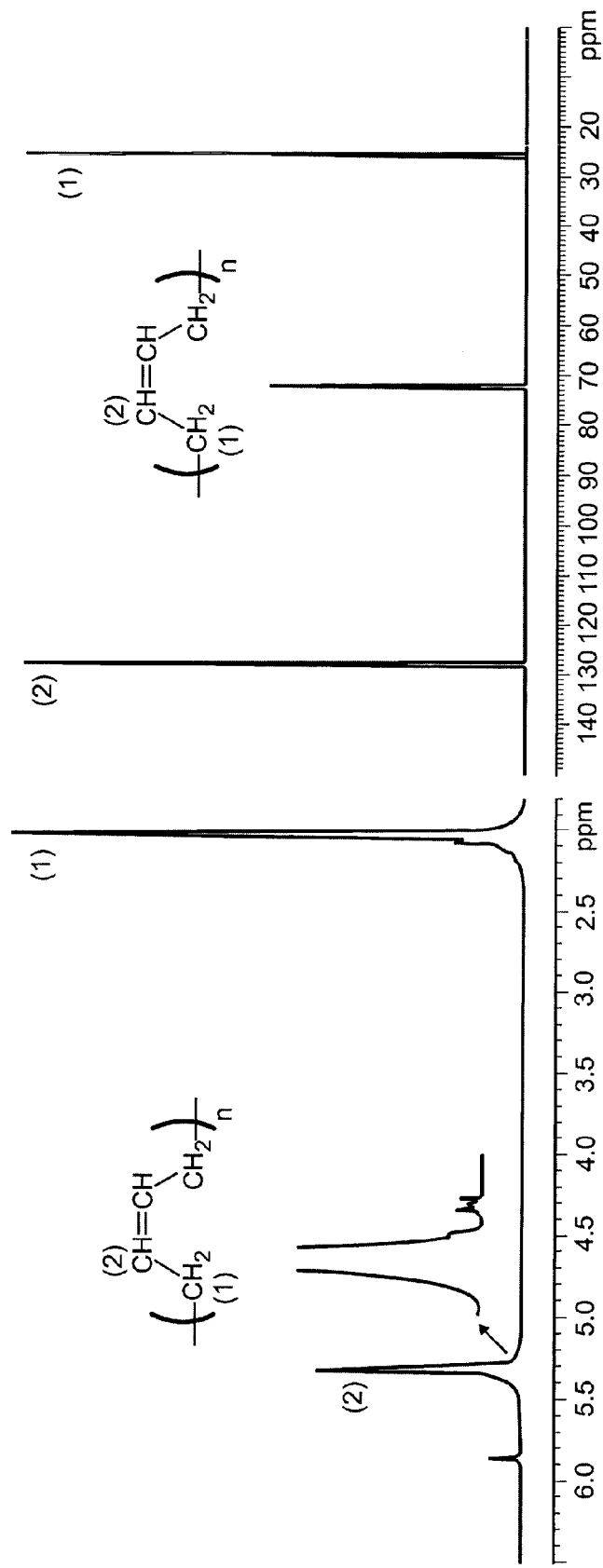
FIG. 5 illustrates $^1$H-NMR spectra (on the left) and $^{13}$C-NMR (on the right) (C$_2$D$_2$Cl$_4$ as deuterated solvent, HMDS as internal standard, 103° C.) of polybutadiene obtained with NdCl$_3$(L8)/DIBAH (Table 1, Example 34)(content of 1,4-cis units equal to 99.5%).

FIG. 5 shows the $^1$H-NMR and $^{13}$C-NMR spectrum of the polybutadiene obtained.

Example 35

P1924

2 ml of 1,3-butadiene, equal to about 1.4 g, were condensed, at a low temperature (−20° C.), in a 25 ml test-tube. 7.15 ml of heptane were then added and the temperature of the solution thus obtained was brought to 20° C. Tetra-iso-butylaluminoxane (TIBAO) in a cyclohexane solution (6.2 ml; $1\times10^{-2}$ moles, equal to about 2.9 g) was then added, and subsequently the complex $NdCl_3(L13)$ [sample P1915] (2.05 ml of a toluene solution at a concentration equal to 2 mg/ml; $1\times10^{-5}$ moles, equal to about 4.1 mg) obtained as described in Example 20. The whole mixture was kept, under magnetic stirring, at 20° C., for 23 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.893 g of polybutadiene having a content of 1,4-cis units>99%: further characteristics of the process and of the polybutadiene obtained are indicated in Table 1.

Example 36

Preparation of the Preformed Ternary Catalytic System $AlEt_2Cl/Nd(OCOC_7H_{15})_3/Al(^iBu)_3$ 15 ml of a heptane solution 0.05 M of neodymium 2-ethylhexanoate [$Nd(OCOC_7H_{15})_3$] ($7.5\times10^{-4}$ moles), 16.6 ml of heptane and 0.29 ml of di-ethyl aluminium chloride ($AlEt_2Cl$) ($2.3\times10^{-3}$ moles) were introduced, consecutively, into a 50 ml test-tube. Upon the addition of di-ethyl aluminium chloride ($AlEt_2Cl$), a whitish suspension was immediately formed, which was kept, under stirring, at room temperature, for 15 minutes. Tri-iso-butylaluminium [$Al(^iBu)_3$] (5.63 ml; $2.25\times10^{-2}$ moles) was subsequently added and the solution obtained was left to age for 2 hours, under constant stirring, at 20° C., obtaining a catalytic suspension having a concentration of neodymium equal to 0.02 M.

Example 37 (Comparative)

2 ml of 1,3-butadiene, equal to about 1.4 g, were condensed, at a low temperature (−20° C.), in a 25 ml test-tube. 7 ml of heptane were then added and the temperature of the solution was brought to 20° C. The preformed ternary catalyst $AlEt_2Cl/Nd(OCOC_7H_{15})_3/Al(^iBu)_3$ (0.5 ml; $1\times10^{-5}$ moles of Nd), obtained as described in Example 36, was then added. The whole mixture was kept, under magnetic stirring, at 20° C., for 1.25 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.78 g of polybutadiene having a content of 1,4-cis units equal to about 96%: further characteristics of the process and polybutadiene obtained are indicated in Table 1.

FIG. 1 shows the $^1$H-NMR spectrum of the polybutadiene obtained.

FIG. 2(a) shows the FT-IR spectrum of the polybutadiene obtained.

TABLE 1

Polymerization of 1,3-butadiene with catalytic systems prepared in situ

| Ex. | Al/Ln (molar ratio) | Conver. (%) | $N^{(a)}$ ($h^{-1}$) | M.p.$^{(b)}$ (° C.) | $T_c^{(c)}$ (° C.) | $M_w \times 10^{-3}$ (g × $mol^{-1}$) | $M_w/M_n$ | $\alpha^{(d)}$ |
|---|---|---|---|---|---|---|---|---|
| 21 | 1000 | 26.4 | 34 | −1.7 | −22.9 | 1100 | 8.2 | 0.61 |
| 22 | 1000 | 55 | 12 | −3.7 | −24.1 | 1160 | 34 | 0.54 |
| 23 | 1000 | 31.3 | 162 | −0.9 | −21.0 | 1200 | 7.8 | 0.62 |
| 24 | 1000 | 57.7 | 13 | −3.0 | −23.5 | 810 | 31 | 0.54 |

TABLE 1-continued

Polymerization of 1,3-butadiene with catalytic systems prepared in situ

| Ex. | Al/Ln (molar ratio) | Conver. (%) | $N^{(a)}$ ($h^{-1}$) | M.p.$^{(b)}$ (° C.) | $T_c^{(c)}$ (° C.) | $M_w \times 10^{-3}$ (g × $mol^{-1}$) | $M_w/M_n$ | $\alpha^{(d)}$ |
|---|---|---|---|---|---|---|---|---|
| 25 | 1000 | 19.8 | 51 | −1.1 | −21.5 | 1300 | 8.5 | 0.60 |
| 26 | 100 | 22.9 | 30 | −1.8 | −21.0 | 1075 | 12.5 | 0.64 |
| 27 | 1000 | 99.3 | 4 | −2.9 | −25.6 | 180 | 3.4 | 0.55 |
| 28 | 1000 | 41.1 | 304 | −1.5 | −22.1 | 1200 | 12 | 0.61 |
| 29 | 100 | 18.5 | 48 | −1.9 | −22.7 | 920 | 15.6 | 0.62 |
| 30 | 1000 | 15.3 | 16 | −2.6 | −24.4 | 490 | 4.6 | 0.56 |
| 31 | 1000 | 51.5 | 1336 | −3.7 | −26.9 | 990 | 8.3 | 0.63 |
| 32 | 100 | 45.0 | 778 | −1.8 | −23.2 | 870 | 6.4 | 0.65 |
| 33 | 1000 | 42.4 | 2199 | −3.9 | −26.8 | 690 | 7.5 | 0.62 |
| 34 | 100 | 46.2 | 1198 | −1.9 | −23.1 | 470 | 12 | 0.63 |
| 35 | 1000 | 63.8 | 72 | −2.0 | −23.0 | 780 | 6.7 | 0.61 |
| 37 | 33 | 50 | 515 | −6 | −33 | 550 | 5 | 0.60 |

$^{(a)}$number of moles of 1,3-butadiene polymerized per hour per mole of lanthanide
$^{(b)}$melting point;
$^{(c)}$crystallization temperature;
$^{(d)}$linearity index of polybutadiene.

Example 38

P1886

2 ml of isoprene, equal to about 1.36 g, were introduced, at a temperature of 20° C., into a 25 ml test-tube. 7.15 ml of heptane were then added and the temperature of the solution was maintained at 20° C. Tetra-iso-butyl-aluminoxane (TIBAO) in a cyclohexane solution (6.22 ml; $1\times10^{-2}$ moles, equal to about 2.9 g) was then added, and subsequently the complex $NdCl_3(L3)$ [sample P1889] (2.65 ml of a toluene solution at a concentration equal to 2 mg/ml; $1\times10^{-5}$ moles, equal to about 5.3 mg) obtained as described in Example 16. The whole mixture was kept, under magnetic stirring, at 20° C., for 120 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units>98% and a glass transition temperature ($T_g$) equal to −65.5° C.: further characteristics of the process and of the polyisoprene obtained are indicated in Table 2.

Example 39

GL758

2 ml of isoprene, equal to about 1.36 g, were introduced, at a temperature of 20° C., into a 25 ml test-tube. 7.05 ml of heptane were then added and the temperature of the solution was maintained at 20° C. Tetra-iso-butyl-aluminoxane (TIBAO) in a cyclohexane solution (6.22 ml; $1\times10^{-2}$ moles, equal to about 2.9 g) was then added, and subsequently the complex $NdCl_3(L6)$ [sample GL618] (2.75 ml of a toluene solution at a concentration equal to 2 mg/ml; $1\times10^{-5}$ moles, equal to about 5.5 mg) obtained as described in Example 17. The whole mixture was kept, under magnetic stirring, at 20° C., for 45 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.653 g of polyisoprene having a content of 1,4-cis units>98% and a glass transition temperature ($T_g$) equal to −65.6° C.: further characteristics of the process and of the polyisoprene obtained are indicated in Table 2.

Example 40

GL798

2 ml of isoprene, equal to about 1.36 g, were introduced, at a temperature of 20° C., into a 25 ml test-tube. 7.05 ml of heptane were then added and the temperature of the solution thus obtained was brought to 50° C. Tetra-iso-butyl-aluminoxane (TIBAO) in a cyclohexane solution (6.22 ml; $1\times10^{-2}$ moles, equal to about 2.9 g) was then added, and subsequently the complex $NdCl_3(L6)$ [sample GL618] (2.75 ml of a toluene solution at a concentration equal to 2 mg/ml; $1\times10^{-5}$ moles, equal to about 5.5 mg) obtained as described in Example 17. The whole mixture was kept, under magnetic stirring, at 50° C., for 22.5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units>98% and a glass transition temperature ($T_g$) equal to −64.9° C.: further characteristics of the process and of the polyisoprene obtained are indicated in Table 2.

Figure 7:
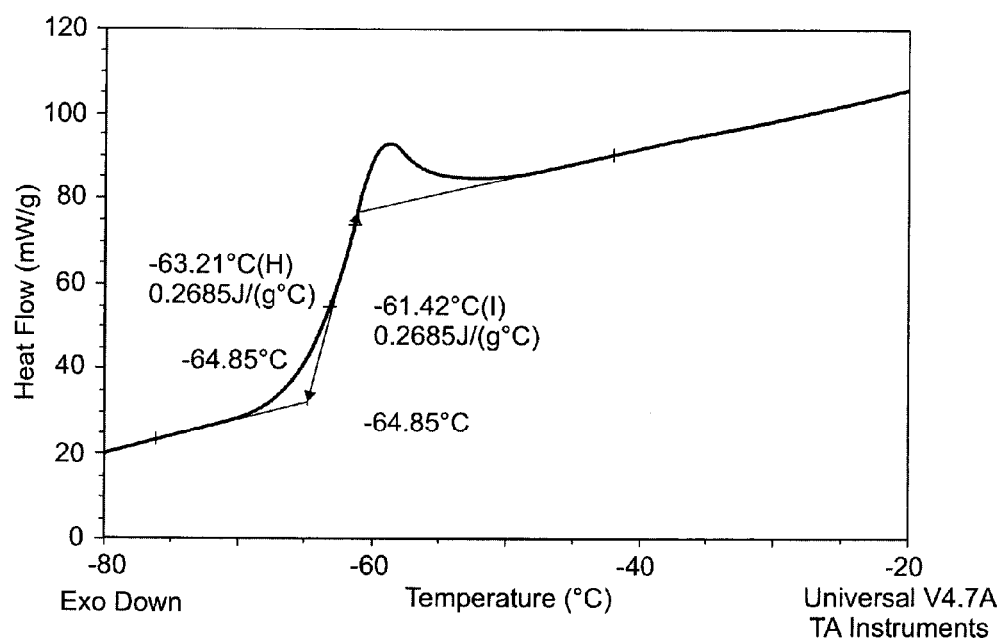
FIG. 7 illustrates a DSC diagram of polyisoprene obtained with NdCl$_3$(L6)/TIBAO (Table 2, Example 40).

FIG. 7 shows the DSC diagram of the polyisoprene obtained.

Example 41

GL804

2 ml of isoprene, equal to about 1.36 g, were introduced, at a temperature of 20° C., into a 25 ml test-tube. 13.07 ml of heptane were then added and the temperature of the solution was brought to 50° C. Di-iso-butyl-aluminium hydride (DIBAH) (0.18 ml; 1 mmole, equal to about 144 mg) was then added, and subsequently the complex $NdCl_3(L6)$ [sample GL618] (2.75 ml of a toluene solution at a concentration equal to 2 mg/ml; $1\times10^{-5}$ moles, equal to about 5.5 mg) obtained as described in Example 17. The whole mixture was kept, under magnetic stirring, at 50° C., for 24 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units>98% and a glass transition temperature ($T_g$) equal to −65.4° C.: further characteristics of the process and of the polyisoprene obtained are indicated in Table 2.

Example 42

GL757

2 ml of isoprene, equal to about 1.36 g, were introduced, at a temperature of 20° C., into a 25 ml test-tube. 7.6 ml of heptane were then added and the temperature of the solution was brought to 20° C. Tetra-iso-butyl-aluminoxane (TIBAO) in a cyclohexane solution (6.22 ml; $1\times10^{-2}$ moles, equal to about 2.9 g) was then added, and subsequently the complex $NdCl_3(L7)$ [sample GL653] (2.2 ml of a toluene solution at a concentration equal to 2 mg/ml; $1\times10^{-5}$ moles, equal to about 4.4 mg) obtained as described in Example 18. The whole mixture was kept, under magnetic stirring, at 20° C., for 20 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.597 g of polyisoprene having a content of 1,4-cis units equal to 98% and a glass transition temperature ($T_g$) equal to −65.2° C.: further characteristics of the process and of the polyisoprene obtained are indicated in Table 2.

Figure 6:
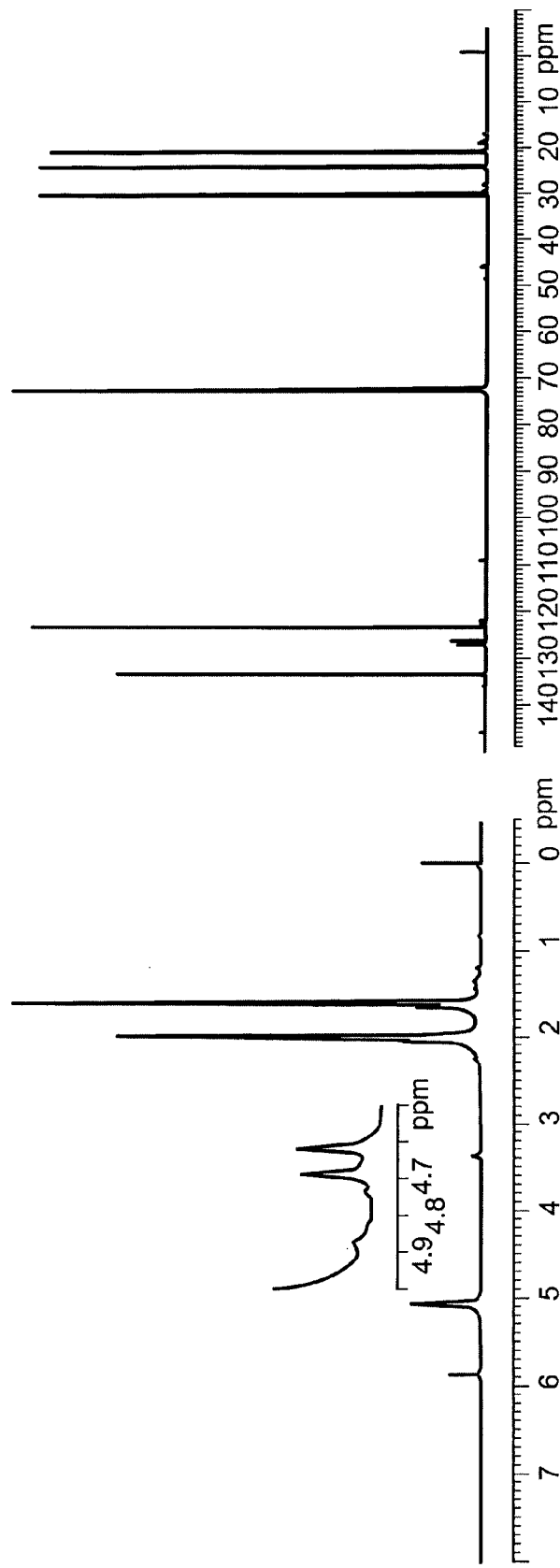
FIG. 6 illustrates $^1$H-NMR spectra (below) and $^{13}$C-NMR spectrum (above) (C$_2$D$_2$Cl$_4$ as deuterated solvent, HMDS as internal standard, 103° C.) of polyisoprene obtained with NdCl$_3$(L7)/TIBAO (Table 2, Example 42)(content of 1,4-cis units equal to 98%).

FIG. 6 shows the $^1$H-NMR and $^{13}$C-NMR spectra of the polyisoprene obtained.

Example 43

GL803

2 ml of isoprene, equal to about 1.36 g, were introduced, at a temperature of 20° C., into a 25 ml test-tube. 7.6 ml of heptane were then added and the temperature of the solution was brought to 50° C. Tetra-iso-butyl-aluminoxane (TIBAO) in a cyclohexane solution (6.22 ml; $1\times10^{-2}$ moles, equal to about 2.9 g) was then added, and subsequently the complex $NdCl_3(L7)$ [sample GL653] (2.2 ml of a toluene solution at a concentration equal to 2 mg/ml; $1\times10^{-5}$ moles, equal to about 4.4 mg) obtained as described in Example 18. The whole mixture was kept, under magnetic stirring, at 50° C., for 5 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units>98% and a glass transition temperature ($T_g$) equal to −64.7° C.: further characteristics of the process and of the polyisoprene obtained are indicated in Table 2.

Figure 8:
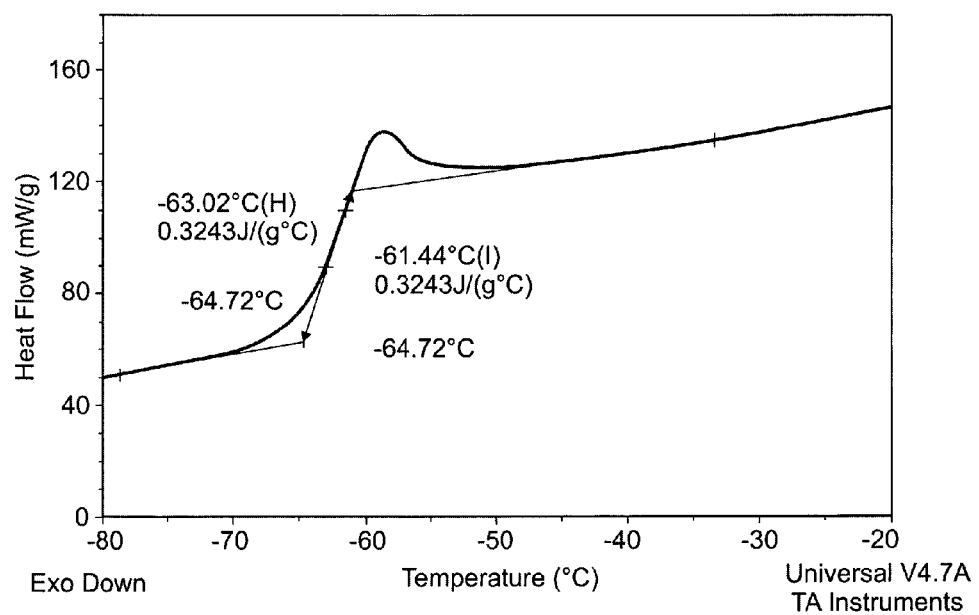
FIG. 8 illustrates a DSC diagram of polyisoprene obtained with NdCl$_3$(L7)/TIBAO (Table 2, Example 43).

FIG. 8 shows the DSC diagram of the polyisoprene obtained.

Example 44

GL801

2 ml of isoprene, equal to about 1.36 g, were introduced, at a temperature of 20° C., into a 25 ml test-tube. 13.62 ml of heptane were then added and the temperature of the solution was brought to 50° C. Di-iso-butyl-aluminium hydride (DIBAH) (0.18 ml; 1 mmole, equal to about 144 mg) was then added, and subsequently the complex $NdCl_3(L7)$ [sample GL653] (2.2 ml of a toluene solution at a concentration equal to 2 mg/ml; $1\times10^{-5}$ moles, equal to about 4.4 mg) obtained as described in Example 18. The whole mixture was kept, under magnetic stirring, at 50° C., for 6 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units>98% and a glass transition temperature ($T_g$) equal to −65.6° C.: further characteristics of the process and of the polyisoprene obtained are indicated in Table 2.

Figure 9:
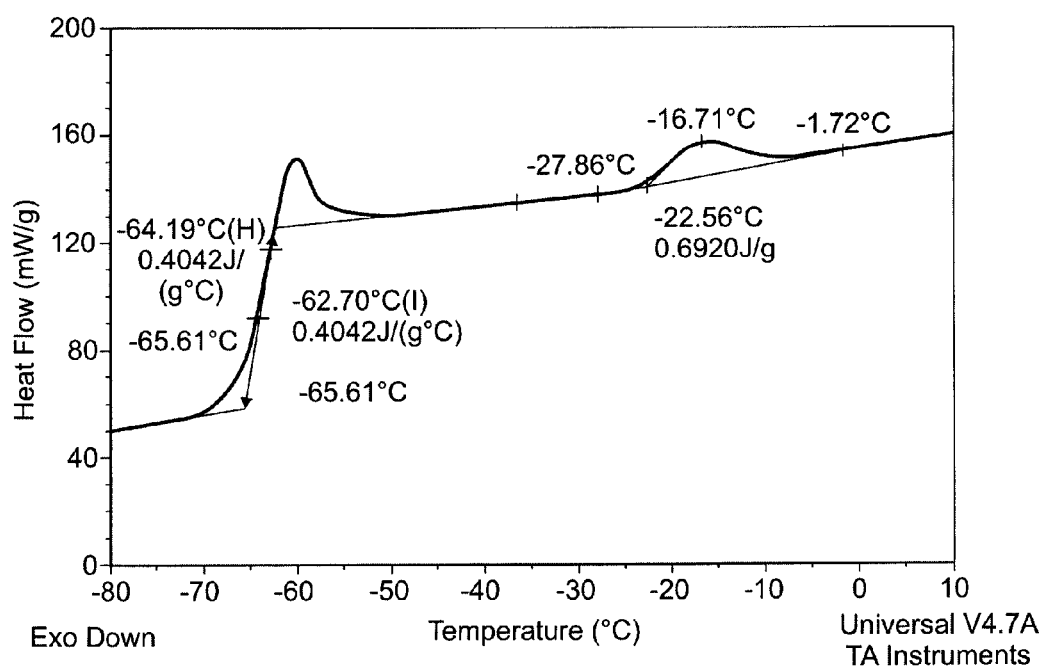
FIG. 9 illustrates a DSC Diagram del polyisoprene obtained with NdCl$_3$(L7)/DIBAH (Table 2, Example 44).

FIG. 9 shows the DSC diagram of the polyisoprene obtained.

Example 45

GL806

2 ml of isoprene, equal to about 1.36 g, were introduced, at a temperature of 20° C., into a 25 ml test-tube. 8.6 ml of heptane were then added and the temperature of the solution was maintained at 20° C. Modified methylaluminoxane (MMAO) in a heptane solution at 7% by weight (5.3 ml; $1 \times 10^{-2}$ moles) was then added, and subsequently the complex $NdCl_3(L7)$ [sample GL653] (2.2 ml of a toluene solution at a concentration equal to 2 mg/ml; $1 \times 10^{-5}$ moles, equal to about 4.4 mg) obtained as described in Example 18. The whole mixture was kept, under magnetic stirring, at 20° C., for 24 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 1.36 g of polyisoprene having a content of 1,4-cis units>98% and a glass transition temperature ($T_g$) equal to −65.8° C.: further characteristics of the process and of the polyisoprene obtained are indicated in Table 2.

Figure 10:
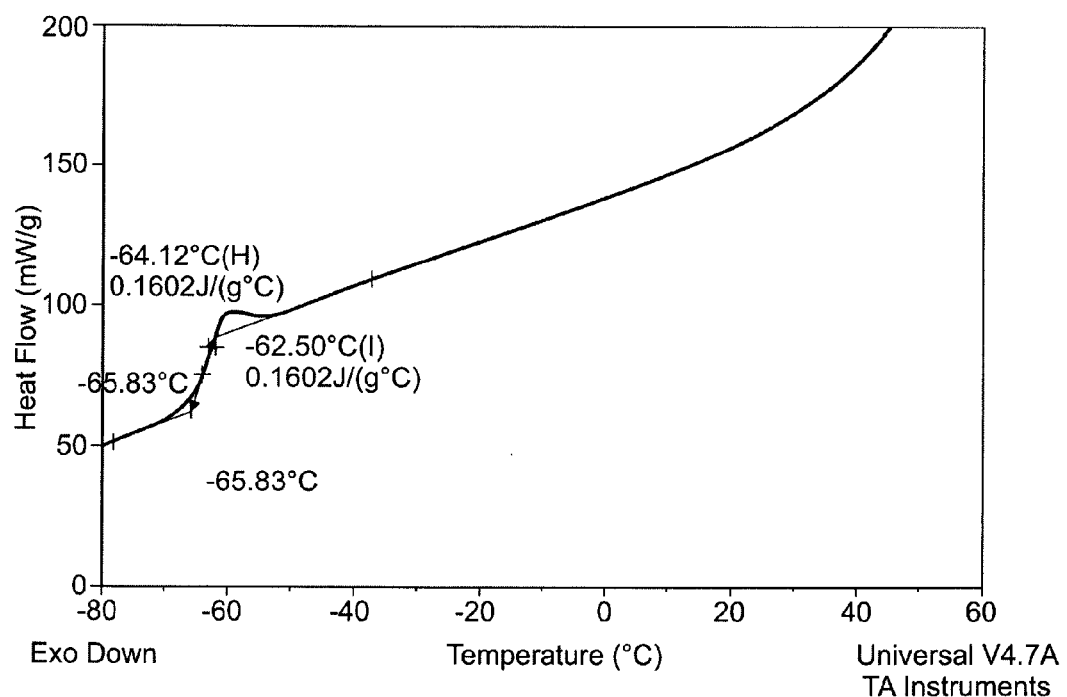
FIG. 10 illustrates a DSC Diagram del polyisoprene obtained with NdCl$_3$(L7)/MMAO (Table 2, Example 45).

FIG. 10 shows the DSC diagram of the polyisoprene obtained.

Example 46 (Comparative)

2 ml of isoprene, equal to about 1.36 g, were introduced, at a temperature of 20° C., into a 25 ml test-tube. 7 ml of heptane were then added and the temperature of the solution was maintained at 20° C. The preformed ternary catalyst $AlEt_2Cl/Nd(OCOC_7H_{15})_3/Al(^iBu)_3$ (0.5 ml; $1 \times 10^{-5}$ moles of Nd), obtained as described in Example 36, was then added. The whole mixture was kept, under magnetic stirring, at 20° C., for 6 hours. The polymerization was then quenched by the addition of 2 ml of methanol containing a few drops of hydrochloric acid. The polymer obtained was subsequently coagulated by the addition of 40 ml of a methanol solution containing 4% of antioxidant Irganox® 1076 (Ciba) obtaining 0.544 g of polyisoprene having a content of 1,4-cis units equal to about 94%: further characteristics of the process and of the polyisoprene obtained are indicated in Table 2.

FIG. 1 shows the H-NMR spectrum of the polyisoprene obtained.

TABLE 2

Polymerization of isoprene with catalytic systems prepared in situ

| Example | Al/Ln (molar ratio) | Conversion (%) | N[a] (h⁻¹) | $M_w \times 10^{-3}$ (g × mol⁻¹) | $M_w/M_n$ | $T_g$[b] |
|---|---|---|---|---|---|---|
| 38 | 1000 | 100 | 17 | 750 | 6.5 | −65.5 |
| 39 | 1000 | 48 | 21 | 790 | 5.5 | −65.6 |
| 40 | 1000 | 100 | 89 | 680 | 5.1 | −64.9 |
| 41 | 100 | 100 | 83 | 720 | 4.9 | −65.4 |
| 42 | 1000 | 43.9 | 44 | 875 | 4.3 | −65.2 |
| 43 | 1000 | 100 | 400 | 950 | 3.8 | −64.7 |
| 44 | 100 | 100 | 333 | 890 | 4.1 | −65.6 |
| 45 | 1000 | 100 | 83 | 750 | 5.3 | −65.8 |
| 46 | 33 | 40 | 133 | 600 | 4 | −62.1 |
| NR[c] | — | — | — | — | — | −66.2 |

Figure 11:
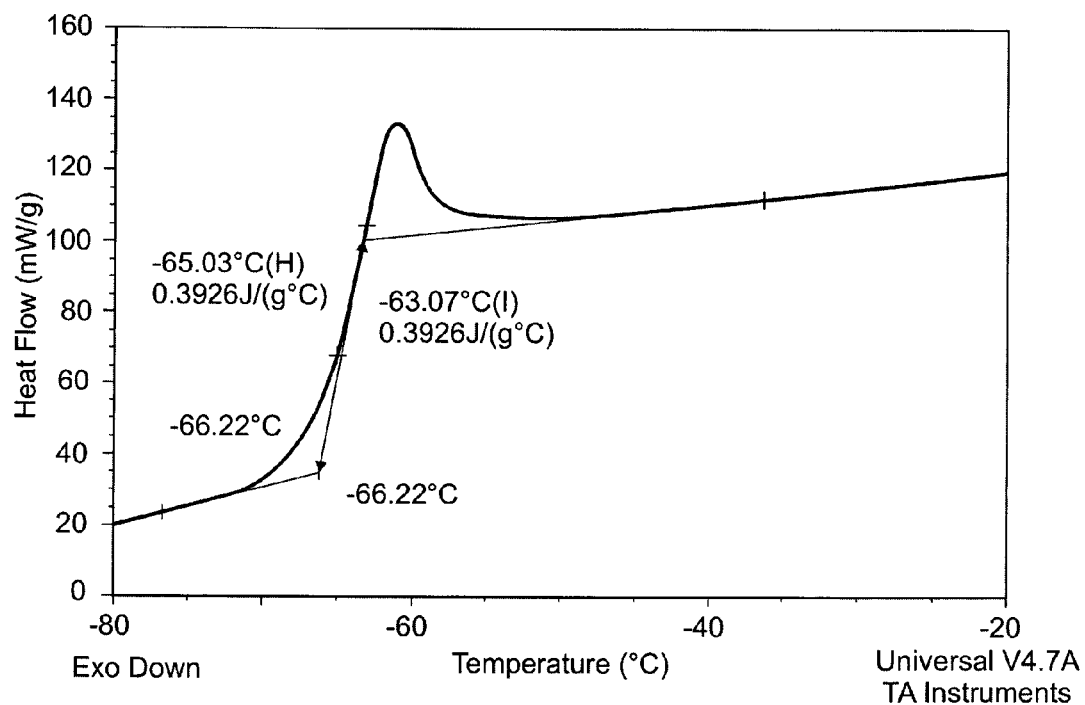
FIG. 11 illustrates a DSC diagram of natural rubber (Table 2, Example NR).

[a] number of moles of isoprene polymerized per hour per mole of lanthanide;
[b] glass transition temperature;
[c] natural rubber (FIG. 11 shows the DSC diagram of natural rubber).

The invention claimed is:

1. An oxo-nitrogenated complex of lanthanides having general formula (I) or (II):

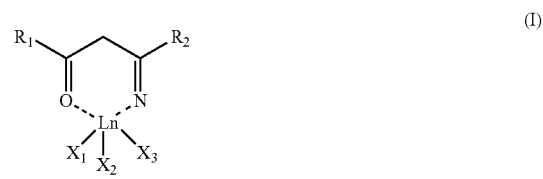

(I)

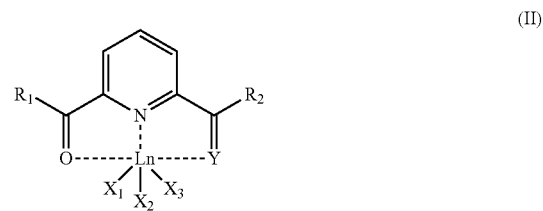

(II)

wherein:

Ln is neodymium (Nd), lanthanum (La), praseodymium (Pr), gadolinium (Gd), europium (Eu), terbium (Tb), samarium (Sm), or erbium (Er);

$R_1$ and $R_2$, equal to or different from each other, represent a hydrogen atom; or they are selected from linear or branched $C_1$-$C_{20}$ alkyl groups, cycloalkyl groups optionally substituted, or aryl groups optionally substituted;

$R_3$ represents a hydrogen atom; or it is selected from linear or branched $C_1$-$C_{20}$ alkyl groups, cycloalkyl groups optionally substituted, or aryl groups optionally substituted; or $R_3$ represents a ketoimine group having the formula:

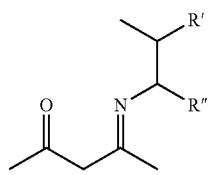

wherein R' and R", equal to or different from each other, represent a hydrogen atom, or they are selected from linear or branched $C_1$-$C_{20}$ alkyl groups, cycloalkyl groups optionally substituted, or aryl groups optionally substituted;

Y represents an oxygen atom; or a —N—$R_4$ group wherein $R_4$ represents a hydrogen atom, or it is selected from linear or branched $C_1$-$C_{20}$ alkyl groups, or cycloalkyl groups optionally substituted;

or, when Y represents a —N—$R_4$ group, $R_2$ and $R_4$ can be optionally bound to each other so to form, together with the other atoms to which they are bound, a saturated, unsaturated or aromatic cycle containing from 3 to 6 carbon atoms, optionally substituted with linear or branched $C_1$-$C_{20}$ alkyl groups, said cycle optionally containing other heteroatoms; and $X_1$, $X_2$ and $X_3$, equal to or different from each other, represent a halogen atom; or they are selected from linear or branched $C_1$-$C_{20}$ alkyl groups, —$OCOR_5$ or —$OR_5$ groups wherein $R_5$ is selected from linear or branched $C_1$-$C_{20}$ alkyl groups.

2. The oxo-nitrogenated complex of lanthanides having general formula (I) according to claim 1, wherein:
- Ln is neodymium (Nd), praseodymium (Pr), gadolinium (Gd), or lanthanum (La);
- $R_1$ and $R_2$, the same as each other, are a hydrogen atom; or they are selected from linear or branched $C_1$-$C_{20}$ alkyl groups; or they are selected from cycloalkyl groups optionally substituted;
- $R_3$ is selected from linear or branched $C_1$-$C_{20}$ alkyl groups, phenyl groups optionally substituted, cycloalkyl groups optionally substituted;
- $X_1$, $X_2$ and $X_3$, the same as each other, represent a halogen atom.

3. The oxo-nitrogenated complex of lanthanides having general formula (II) according to claim 1, wherein:
- Ln is neodymium (Nd), praseodymium (Pr), gadolinium (Gd), or lanthanum (La);
- $R_1$ and $R_2$, the same as each other, are a hydrogen atom; or they are selected from linear or branched $C_1$-$C_{20}$ alkyl groups; or they are selected from cycloalkyl groups optionally substituted;
- Y is an oxygen atom, or a —N—$R_4$ group wherein $R_4$ is selected from linear or branched $C_1$-$C_{20}$ alkyl groups, or cycloalkyl groups optionally substituted; and
- $X_1$, $X_2$ and $X_3$, the same as each other, are a halogen atom.

4. A catalytic system for the (co)polymerization of conjugated dienes comprising:
(a) at least one oxo-nitrogenated complex of lanthanides having general formula (I) or (II) according claim 1;
(b) at least one co-catalyst selected from:
($b_1$) aluminium alkyls having general formula (III):

$$Al(X')_n(R_6)_{3-n} \qquad (III)$$

wherein X' represents a halogen atom; $R_6$ is selected from linear or branched $C_1$-$C_{20}$ alkyl groups, $C_3$-$C_{20}$ cycloalkyl groups, or aryl groups, said groups being optionally substituted with one or more atoms of silicon or germanium; and n is an integer ranging from 0 to 2;

($b_2$) aluminumoxanes having general formula (IV):

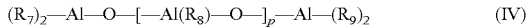

$$(R_7)_2—Al—O—[—Al(R_8)—O—]_p—Al—(R_9)_2 \qquad (IV)$$

wherein $R_7$, $R_8$ and $R_9$, equal to or different from each other, represent a hydrogen atom, a halogen atom; or they are selected from linear or branched $C_1$-$C_{20}$ alkyl groups, $C_3$-$C_{20}$ cycloalkyl groups, aryl groups, said groups being optionally substituted with one or more atoms of silicon or germanium; and p is an integer ranging from 0 to 1,000; or ($b_3$) compounds having general formula (V):

$$D^+E^- \qquad (V)$$

wherein $D^+$ represents a Brønsted acid capable of releasing a proton and of reacting irreversibly with the substituent X of the oxo-nitrogenated complex of lanthanides having general formula (I) or (II); $E^-$ represents a compatible anion capable of stabilizing the active catalytic species generated by the reaction of the two components and which is sufficiently labile as to be removed by an olefin monomer, or an anion having general formula $B(Ar)_4^{(-)}$ wherein the substituents Ar, equal to or different from each other, are selected from aryl groups.

5. The catalytic system for the (co)polymerization of conjugated dienes according to claim 4, wherein said co-catalyst (b) is selected from tri-iso-butyl-aluminium (TIBA), di-iso-butyl-aluminium hydride (DIBAH), methylaluminumoxane (MAO), or tetra-iso-butyl-aluminumoxane (TIBAO).

6. The catalytic system for the (co)polymerization of conjugated dienes according to claim 4, wherein in said catalytic system the molar ratio between the lanthanide present in the oxo-nitrogenated complex of lanthanides (a) having general formula (I) or (II) and the aluminium present in the co-catalyst (b) selected from aluminium alkyls ($b_1$) or aluminumoxanes ($b_2$), ranges from 5 to 5,000.

7. The catalytic system for the (co)polymerization of conjugated dienes according to claim 4, wherein in said catalytic system the molar ratio between the lanthanide present in the oxo-nitrogenated complex of lanthanides (a) having general formula (I) or (II) and the boron present in the co-catalyst (b) selected from compounds ($b_3$) having general formula (V), ranges from 0.1 to 15.

8. The catalytic system according to claim 4, wherein said conjugated dienes are 1,3-butadiene, or isoprene.

* * * * *

UNITED STATES PATENT AND TRADEMARK OFFICE
CERTIFICATE OF CORRECTION

PATENT NO.         : 9,200,101 B2                                      Page 1 of 1
APPLICATION NO.    : 14/344016
DATED              : December 1, 2015
INVENTOR(S)        : Giovanni Ricci It is certified that error appears in the above-identified patent and that said Letters Patent is hereby corrected as shown below:

Column 40, line 6, the chemical structure:

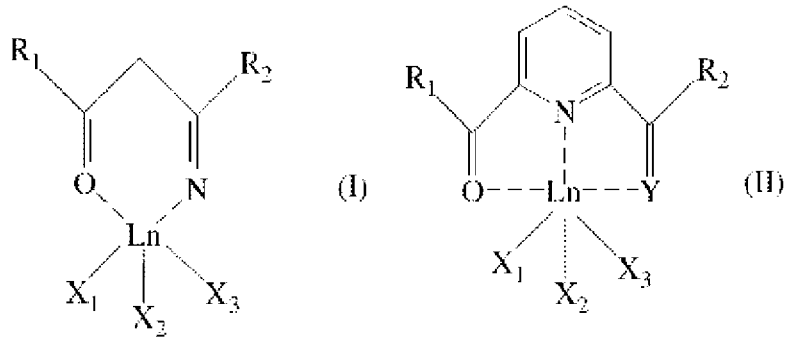

Should be:

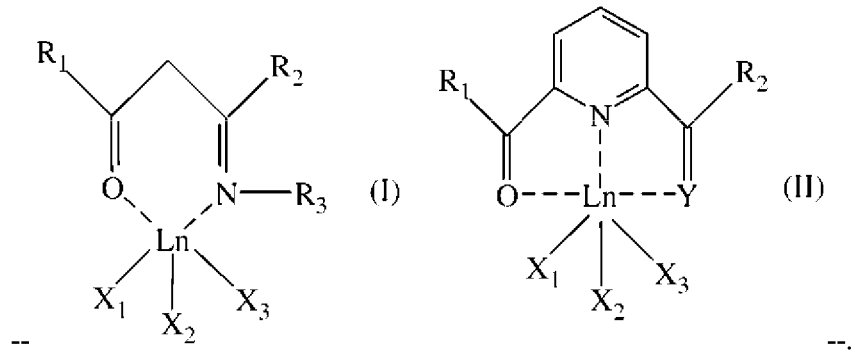

Signed and Sealed this
Twenty-ninth Day of March, 2016

Michelle K. Lee
*Director of the United States Patent and Trademark Office*